US012581050B2

(12) United States Patent (10) Patent No.: US 12,581,050 B2
Shutov et al. (45) Date of Patent: Mar. 17, 2026

(54) OPTICAL ASSEMBLIES FOR MACHINE VISION CALIBRATION

(71) Applicant: 10x Genomics, Inc., Pleasanton, CA (US)

(72) Inventors: Anton Shutov, San Leandro, CA (US); Denis Pristinski, Dublin, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 18 days.

(21) Appl. No.: 18/513,143

(22) Filed: Nov. 17, 2023

(65) Prior Publication Data

US 2024/0171723 A1 May 23, 2024

Related U.S. Application Data

(60) Provisional application No. 63/427,711, filed on Nov. 23, 2022.

(51) Int. Cl.
*H04N 13/246* (2018.01)
*H04N 13/207* (2018.01)
*H04N 13/254* (2018.01)

(52) U.S. Cl.
CPC ......... *H04N 13/246* (2018.05); *H04N 13/207* (2018.05); *H04N 13/254* (2018.05)

(58) Field of Classification Search
CPC .. H04N 13/207; H04N 13/218; H04N 13/246; H04N 13/254

(Continued)

(56) References Cited

U.S. PATENT DOCUMENTS 4,281,926 A * 8/1981 Cornsweet ......... G01M 11/0235
                                                          250/236
5,599,675 A    2/1997 Brenner
                (Continued)

FOREIGN PATENT DOCUMENTS

JP           3962444 B2 * 8/2007 ............. G02B 21/22
WO     WO 2018/026873    2/2018
                (Continued)

OTHER PUBLICATIONS

Chen et al., "Spatially Resolved, Highly Multiplexed RNA Profiling In Single Cells", Science, 348(6233): aaa6090, 2015.
                (Continued)

*Primary Examiner* — Behrooz M Senfi
(74) *Attorney, Agent, or Firm* — Patterson + Sheridan, LLP

(57) ABSTRACT

An optical assembly of a machine vision system for calibrating and/or positioning of various motion control modules of an analytical system/tool/instrument having integrated optics and fluidics modules configured for imaging of biological specimens is disclosed. The optical assembly includes one or more light sources configured to generate a first light beam and a second light beam that intersects the first light beam at an intersection region to illuminate an object within the intersection region; a sensor array configured to receive the first light beam and the second light beam to thereby form a stereo-image based on received light from the first light beam and the second light beam; a first imaging mirror configured to reflect the first beam after the intersection region and towards the sensor array; and a second imaging mirror configured to reflect the second beam after the intersection region and towards the sensor array.

20 Claims, 25 Drawing Sheets

(58) Field of Classification Search

USPC .......................................... 359/641; 348/49

See application file for complete search history.

(56) References Cited

U.S. PATENT DOCUMENTS

| | | | |
|---|---|---|---|
| 5,750,341 | A | 5/1998 | Macevicz |
| 6,172,218 | B1 | 1/2001 | Brënner |
| 6,306,597 | B1 | 10/2001 | Macevicz |
| 6,969,488 | B2 | 11/2005 | Bridgham et al. |
| 7,057,026 | B2 | 6/2006 | Barnes et al. |
| 7,632,641 | B2 | 12/2009 | Dirks et al. |
| 7,709,198 | B2 | 5/2010 | Luo et al. |
| 8,551,710 | B2 | 10/2013 | Bernitz et al. |
| 8,604,182 | B2 | 12/2013 | Luo et al. |
| 8,658,361 | B2 | 2/2014 | Wu et al. |
| 8,951,726 | B2 | 2/2015 | Luo et al. |
| 9,217,178 | B2 | 12/2015 | Fedurco et al. |
| 10,138,509 | B2 | 11/2018 | Church et al. |
| 10,179,932 | B2 | 1/2019 | Church et al. |
| 10,450,599 | B2 | 10/2019 | Pierce et al. |
| 10,457,980 | B2 | 10/2019 | Cai |
| 10,494,662 | B2 | 12/2019 | Church et al. |
| 10,550,429 | B2 | 2/2020 | Harada et al. |
| 2005/0100900 | A1 | 5/2005 | Kawashima et al. |
| 2006/0188901 | A1 | 8/2006 | Barnes et al. |
| 2006/0240439 | A1 | 10/2006 | Smith et al. |
| 2006/0281109 | A1 | 12/2006 | Ost et al. |
| 2007/0166705 | A1 | 7/2007 | Milton et al. |
| 2009/0118128 | A1 | 5/2009 | Liu et al. |
| 2011/0059865 | A1 | 3/2011 | Smith et al. |
| 2012/0270305 | A1 | 10/2012 | Reed et al. |
| 2013/0079232 | A1 | 3/2013 | Kain et al. |
| 2013/0260372 | A1 | 10/2013 | Buermann et al. |
| 2016/0024555 | A1 | 1/2016 | Church et al. |
| 2016/0108458 | A1 | 4/2016 | Frei et al. |
| 2016/0369329 | A1 | 12/2016 | Cai et al. |
| 2017/0009278 | A1 | 1/2017 | Söderberg et al. |
| 2017/0220733 | A1 | 8/2017 | Zhuang et al. |
| 2018/0052314 | A1* | 2/2018 | Brinkman ............ G02B 21/22 |
| 2019/0055594 | A1 | 2/2019 | Samusik et al. |
| 2019/0106733 | A1 | 4/2019 | Kishi et al. |
| 2019/0161796 | A1 | 5/2019 | Hauling et al. |
| 2019/0177800 | A1 | 6/2019 | Boutet et al. |
| 2019/0194709 | A1 | 6/2019 | Church et al. |
| 2019/0367969 | A1 | 12/2019 | Belhocine et al. |
| 2020/0224243 | A1 | 7/2020 | Desai et al. |
| 2020/0224244 | A1 | 7/2020 | Nilsson et al. |
| 2021/0164039 | A1 | 6/2021 | Wang et al. |
| 2021/0340618 | A1 | 11/2021 | Kühnemund et al. |
| 2022/0010358 | A1 | 1/2022 | Kühnemund et al. |
| 2022/0064697 | A1 | 3/2022 | Zhuang et al. |
| 2022/0121022 | A1* | 4/2022 | Wang .................. G02B 21/082 |

FOREIGN PATENT DOCUMENTS

| | | | |
|---|---|---|---|
| WO | WO-2020144218 A1 * | 7/2020 | ............ G06T 15/50 |
| WO | WO 2021/138676 | 7/2021 | |
| WO | WO 2021/167526 | 8/2021 | |

OTHER PUBLICATIONS

Choi et al., "Third-Generation In Situ Hybridization Chain Reaction: Multiplexed, Quantitative, Sensitive, Versatile, Robust", *Development*, 145(12): dev165753, 2018.

Eng et al., "Transcriptome-Scale Super-Resolved Imaging in Tissues By RNA SeqFISH+", *Nature*, 568(7751): 235-239, 2019.

Frei et al., "Highly Multiplexed Simultaneous Detection Of RNAs And Proteins In Single Cells", *Nat Methods*, 13(3): 269-275, 2016.

Goh et al., "Highly Specific Multiplexed RNA Imaging In Tissues With Split-FISH", *Nat Methods*, 17(7): 689-693, 2020.

Gyllborg et al., "Hybridization-Based In Situ Sequencing (HybISS) For Spatially Resolved Transcriptomics In Human And Mouse Brain Tissue", *Nucleic Acid Res*, 48(19): e112, 2020.

Lee et al., "Highly Multiplexed Subcellular RNA Sequencing In Situ", *Science*, 342(6177): 1360-1363, 2014.

Mitra et al., "Fluorescent In Situ Sequencing On Polymerase Colonies", *Anal. Biochem*, 320: 55-65, 2003.

Moffitt et al., "RNA Imaging With Multiplexed Error-Robust Fluorescence In Situ Hybridization (MERFISH)", *Methods of Enzymology*, 572: 1-49, 2016.

Nagendran et al., "Automated Cell-Type Classification In Intact Tissues By Single-Cell Molecular Profiling", *eLife*, 7: e30510, 2018.

Shendure et al., "Accurate Multiplex Polony Sequencing Of An Evolved Bacterial Genome", *Science*, 309: 1728-1732, 2005.

Tripathi et al., "Z Probe, An Efficient Tool For Characterizing Long Non-Coding RNA In FFPE Tissues", *Noncoding RNA*, 4(3): 20, 2018.

Wang et al., "Three-Dimensional Intact-Tissue Sequencing Of Single-Cell Transcriptional States", *Science*, 361(6499): 5691, 2018.

Wu et al., "RollFISH Achieves Robust Quantification Of Single-Molecule RNA Biomarkers In Paraffin-Embedded Tumor Tissue Samples", *Commun Biol*, 1, 209, 2018.

Yang et al., "Single-Cell Phenotyping Within Transparent Intact Tissue Through Whole-Body Clearing", *Cell*, 158(4): 945-958, 2014.

* cited by examiner

OPTICAL ASSEMBLIES FOR MACHINE VISION CALIBRATION

CROSS REFERENCE TO RELATED APPLICATION

This application claims priority to U.S. provisional patent application Ser. No. 63/427,711 filed Nov. 23, 2022, the entire content of which is incorporated herein by reference and relied upon.

FIELD OF THE DISCLOSURE

The present disclosure generally relates to optical assemblies for machine vision calibration in an instrument. More particularly, the present disclosure relates to a machine vision system used for calibrating and/or positioning of various components of an opto-fluidic instrument, e.g., an instrument having integrated optics and fluidics modules (an in situ analysis system), configured for imaging of biological specimens.

BACKGROUND

Analytical systems/tools used for imaging biological specimens require the components of the analytical systems/tools to be suitable for performing the imaging a biological sample at an optimal condition and/or a preferred biological state of the sample. As off-the-shelf components and currently existing solutions may not be adequate for use in state-of-the-art or next-generation imaging systems/tools, there is a need for a specifically designed and purposefully configured machine vision system that can be used to calibrate various motion control systems/components that can be used for precise and reliable positioning various instrumental components of the imaging system/tool configured imaging of biological specimens.

SUMMARY

In various embodiments, an optical assembly includes one or more light sources configured to generate a first light beam and a second light beam that intersects the first light beam at an intersection region to thereby illuminate an object within the intersection region. The optical assembly includes a sensor array configured to receive the first light beam and the second light beam to thereby form a stereo-image based on received light from the first light beam and the second light beam. The optical assembly includes a first imaging mirror configured to reflect the first light beam after the intersection region and towards the sensor array. The optical assembly includes a second imaging mirror configured to reflect the second light beam after the intersection region and towards the sensor array.

In various embodiments, the optical assembly may include a focusing lens configured to collect and focus reflected light from the first imaging mirror to a first portion of the sensor array and from the second imaging mirror to a second portion of the sensor array. The optical assembly may include a first folding mirror configured to redirect the first light beam from the one or more light sources onto the object and the first imaging mirror. The optical assembly may include a second folding mirror configured to redirect the second light beam from the one or more light sources onto the object and the second imaging mirror. The optical assembly may include a first collimating lens configured to collimate the first light beam from the one or more light sources onto the object and the first imaging mirror. The optical assembly may include a second collimating lens configured to collimate the second light beam from the one or more light sources onto the object and the second imaging mirror.

In various embodiments, a machine vision system includes an optical assembly as described herein. The machine vision system includes a computing node for processing one or more stereo-images received from the sensor array, wherein the computing node is configured for determining a three-dimensional shape, a three-dimensional location, and/or a trajectory of the object based on the one or more stereo-images.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
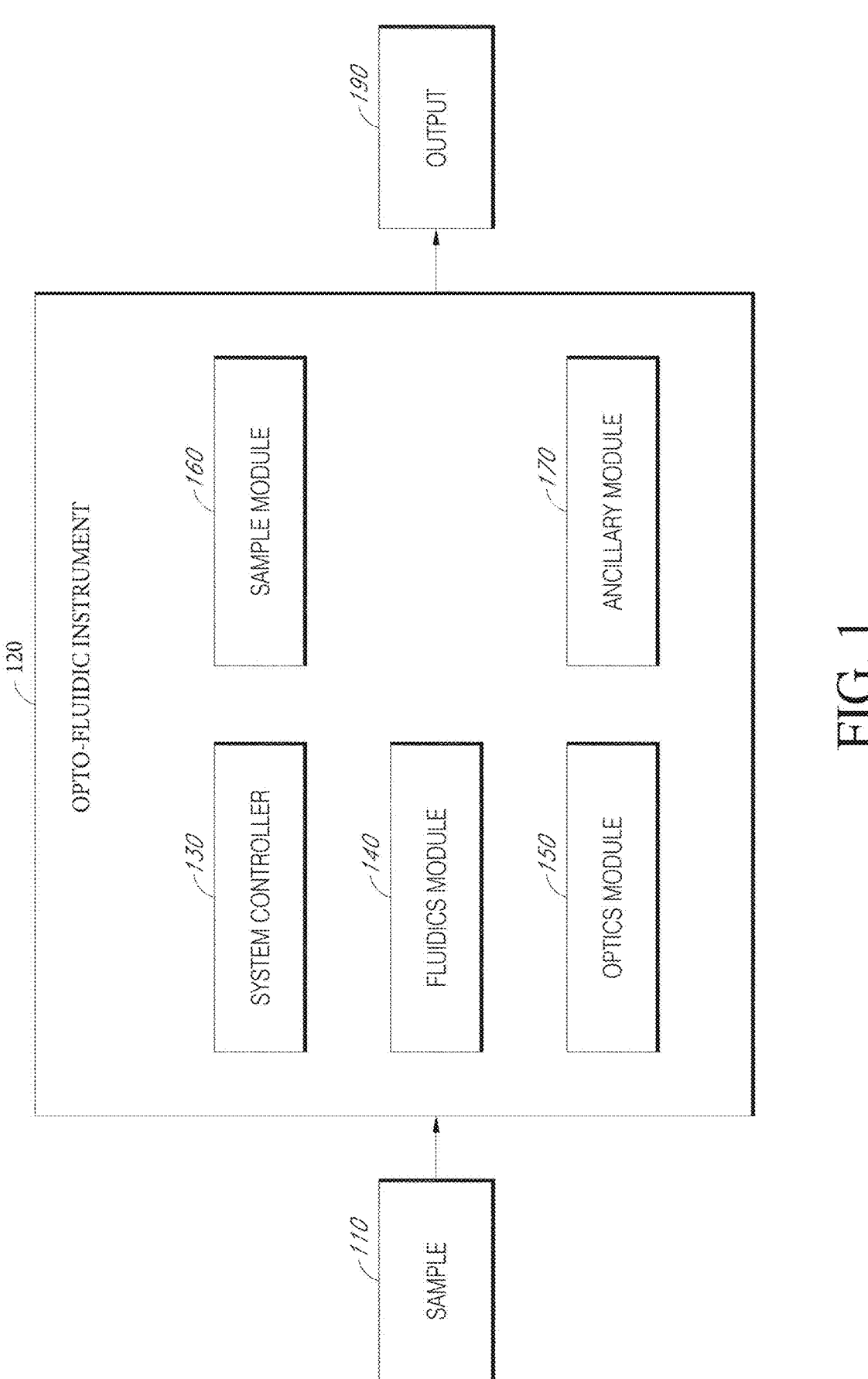
FIG. 1 is an example workflow of analysis of a biological sample (e.g., a cell or tissue sample) using an opto-fluidic instrument, according to various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

Target molecules (e.g., nucleic acids, proteins, antibodies, etc.) can be detected in biological samples (e.g., one or more cells or a tissue sample) using an instrument having integrated optics and fluidics modules (an "opto-fluidic instrument" or "opto-fluidic system"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, etc.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from eukaryotic mammalian and eukaryotic non-mammalian organisms (e.g., a plant, a fungus, an insect, an arachnid, a nematoda, a reptile, or an amphibian). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay using the opto-fluidic instruments disclosed herein. Except where indicated otherwise, the preparative or processing steps described below can generally be combined in any manner and in any order to appropriately prepare or process a particular sample for and/or analysis.

For example, a biological sample can be harvested from a subject (e.g., via surgical biopsy, whole subject sectioning) or grown in vitro on a growth substrate or culture dish as a population of cells and prepared for analysis as a tissue slice or tissue section (e.g., a fresh frozen, fixed frozen, or formalin fixed paraffin embedded (FFPE) tissue section). The thickness of a tissue section typically depends on the method used to prepare the section and the physical characteristics of the tissue, and therefore sections having a wide variety of different thicknesses can be prepared and used.

In various instances, the biological sample is fixed in any of a variety of suitable fixatives to preserve the biological structure of the sample prior to analysis. Example fixatives include formalin, formaldehyde, ethanol, methanol, acetone, paraformaldehyde (PFA)-Triton, and combinations thereof.

In various embodiments, a biological sample can be permeabilized to facilitate transfer of analytes out of the sample, and/or to facilitate transfer of species (such as probes or probes sets) into the sample. In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases).

In some embodiments, the biological sample is embedded in a polymer and/or crosslinked matrix (e.g., a hydrogel matrix). Embedding the sample in this manner typically involves contacting the biological sample with a hydrogel such that the biological sample becomes surrounded by the hydrogel. For example, the sample (e.g., a tissue section on a substrate, such as a glass substrate) can be embedded by contacting the sample with a suitable polymer material and activating the polymer material to form a hydrogel. In some embodiments, the hydrogel is formed such that the hydrogel is internalized within the biological sample. In some embodiments, the biological sample (including biological analytes) is immobilized in the hydrogel via cross-linking of the polymer material that forms the hydrogel. Cross-linking can be performed chemically and/or photochemically, or alternatively by any other suitable hydrogel-formation method. In some instances, biological molecules (or derivatives thereof) are cross-linked or otherwise covalently attached to the hydrogel. For example, in some embodiments, nucleic acid molecules (or derivatives thereof, such as an amplification product or probe(s) bound to cellular nucleic acid molecule) in a tissue sample are cross-linked or otherwise covalently attached to the hydrogel.

Hydrogels embedded within biological samples can be cleared using any suitable method. For example, electrophoretic tissue clearing methods or surfactant-based (e.g., sodium dodecyl sulfate (SDS)) clearing methods can be used to remove biological macromolecules from the hydrogel-embedded sample.

Tissue clearing is a process of optically resolving a sample or complex biological material, such as whole organs, large tissue, and cellular models, with minimal changes to morphology and without compromising the ability for immunolabeling or fluorescence imaging detection. In various embodiments, refractive index matching is used for obtaining fluorescence images. Mismatching among mediums can cause loss of imaging resolution, as light may also travel through the sample itself, a mounting media, glass coverslip, oil, and/or a microscope objective. In various embodiments, the amount of variable scattering of light from cellular membranes, lipids, and/or molecules of the specimen is reduced (e.g., minimized) using the various methods described herein. Heterogeneity of scattering among the cellular components may lead to an increase in opaqueness of an image. In various embodiments, a denser makeup of lipids, trafficking organelles, and other subcellular molecules may increase lateral, or non-forward, light scattered. In various embodiments, non-forward light scattering in situ may not pass through the specimen, as it is exacerbated by the continuous, pinball like, interactions of scattered light with neighboring molecules. In various embodiments, through the multiplicity of scattering, refraction, and absorbance the energy of light may be reduced or ultimately lost, leading to a distorted and white, non-translucent image. In various embodiments, a clearing reagent and mountant optically clears the sample by matching the refractive index to minimizing the light scattering through the specimen and to the microscope objective.

In various embodiments, optical clearing may be performed via various different approaches, primarily being divided into chemical and matrix-based approaches. In various embodiments, chemical approaches include aqueous-based or solvent-based approaches to achieve a highly resolved 3D image for immunolabeling, immuno-cytochemistry, immuno-histochemistry, and/or immunofluorescence. In various embodiments, aqueous-based clearing approaches are generally used to avoid dehydration and toxicity, which can destroy the integrity of a sample.

In various embodiments, passive clarity technique (PACT) is a passive tissue clearing and immunolabeling protocol. In various embodiments PACT is used for intact thick organs. In various embodiments, RIMS includes a protocol for passive tissue clearing and immunostaining of intact organs that is compatible for long-term storage and has imaging media that preserves fluorescent markers over months.

In various embodiments, refractive index matching solutions (RIMS) may be produced with sugar or glycerol for simple, passive immersion. This may be used with thinner or smaller samples, as they are easier to clear and can maintain fluorescent protein emission. In various embodiments, such immersion techniques may achieve less than 1.5 refractive index and can take days to achieve clearing, resulting in reduced image quality when compared to solvent approaches, due to refractive index mismatching between the cleared sample, the glass coverslip, and immersion oil (glass and oil have an RI of 1.51). As sugar or glycerol solutions may take extended periods for clearing, a sample can experience considerable shrinkage while losing lipid content. In various embodiments, commercially available solutions control morphological alterations and loss of lipid content while achieving a higher refractive index of 1.52. In various embodiments, considerations for clearing include sample type and thickness so that there is minimal shrinkage of the sample and preservation of lipid content and fluorescence.

In various embodiments, perfusion-assisted agent release in situ (PARS) includes a method for whole-body clearing and phenotyping compatible with endogenous fluorescence. In various embodiments, all steps for PARS, including preservation, clearing, and labeling, are performed in situ prior to tissue extraction. In various embodiments, PARS, together with RIMS, transform opaque, intact, whole-organisms into optically transparent, fluorescently labeled samples for visualization with conventional confocal microscopy and phenotypic analysis at the cellular, subcellular, and/or single-molecule transcripts level as described in Yang et al., "Single-Cell Phenotyping within Transparent Intact Tissue through Whole-Body Clearing" *Cell.* 158(4): 945-958, (2014) (https://doi.org/10.1016/j.cell.2014.07.017).

A biological sample may comprise one or a plurality of analytes of interest. The opto-fluidic instruments disclosed herein can be used to detect and analyze a wide variety of different analytes. In some aspects, an analyte can include any biological substance, structure, moiety, or component to be analyzed. For example, the analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g., an affinity binding partner) can be developed and detected (e.g., using the opto-fluidic instruments disclosed herein).

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof. The analyte may be a single molecule or a complex that contains two or more molecular subunits, e.g., including but not limited to complexes between proteins or peptides and nucleic acid molecules such as DNA or RNA, e.g., interactions between proteins and nucleic acids, e.g., regulatory factors, such as transcription factors, and DNA or RNA.

In some embodiments, the opto-fluidic instruments described herein can be utilized for the in situ detection and analysis of cellular analytes, (such as nucleic acid sequences), such as fluorescent in situ hybridization (FISH)-based methods, in situ transcriptomic analysis, or in situ sequencing, for example from intact tissues or samples in which the spatial information has been preserved. In some aspects, the embodiments can be applied in an imaging or detection method for multiplexed nucleic acid analysis. In some aspects, the provided opto-fluidic instruments can be used to detect a signal associated with a detectable label of a nucleic acid probe that is hybridized to a target sequence of a target nucleic acid in a biological sample.

Disclosed herein, in some aspects, are labelling agents (e.g., nucleic acid probes and/or probe sets) that are introduced into a cell or used to otherwise detect an analyte in a biological sample such as a tissue sample. The labelling agents include nucleic acid-based probes (e.g., the primary probes disclosed herein and/or any detectable probe disclosed herein) and may comprise any of a variety of entities that can hybridize to a nucleic acid, typically by Watson-Crick base pairing, such as DNA, RNA, LNA, PNA, etc. The nucleic acid probes may comprise a hybridization region that is able to directly or indirectly bind to at least a portion of a target sequence in a target nucleic acid. The nucleic acid probe may be able to bind to a specific target nucleic acid (e.g., an mRNA, or other nucleic acids disclosed herein).

Specific probe designs can vary depending on the application and any suitable probe or probe set may be utilized and detected using the opto-fluidic instruments described herein. In some aspects, the probes or probe sets described herein, or intermediate probes (e.g., a secondary probe, and/or a higher order probe) can be selected from the group consisting of a circular probe, a circularizable probe, and a linear probe. In some embodiments, a circular probe is pre-circularized prior to hybridization to a target nucleic acid and/or one or more other probes. In some embodiments, a circularizable probe is circularized (e.g., by ligation) upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence, such a one or more barcode sequence, or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

In some embodiments, a primary probe, a secondary probe, and/or a higher order probe disclosed herein can comprise a padlock-like probe or probe set, such as one described in U.S. Pat. No. 8,551,710, US 2020/0224244, US 2019/0055594, US 2021/0164039, US 2016/0108458, or US 2020/0224243, each of which is incorporated herein by reference in its entirety. Any suitable combination of the probe designs described herein can be used.

In some embodiments, the probes or probe sets described herein (e.g., a primary probe, or a secondary probe, and/or a higher order probe disclosed herein) can comprise two or more parts. In some cases, a probe can comprise one or more features of and/or be modified based on: a split FISH probe or probe set described in WO 2021/167526A1 or Goh et al., "Highly specific multiplexed RNA imaging in tissues with split-FISH," *Nat Methods* 17(7):689-693 (2020), which are incorporated herein by reference in their entireties; a Z-probe or probe set, such as one described in U.S. Pat. Nos. 7,709,198 B2, 8,604,182 B2, 8,951,726 B2, 8,658,361 B2, or Tripathi et al., "Z Probe, An Efficient Tool for Characterizing Long Non-Coding RNA in FFPE Tissues," *Noncoding RNA* 4(3):20 (2018), which are incorporated herein by reference in their entireties; an HCR initiator or amplifier, such as one described in U.S. Pat. No. 7,632,641 B2, US 2017/0009278 A1, U.S. Pat. No. 10,450,599 B2, or Choi et al., "Third-generation in situ hybridization chain reaction: multiplexed, quantitative, sensitive, versatile, robust," *Development* 145(12): dev165753 (2018), which are incorporated herein by reference in their entireties; a PLAYR probe or probe set, such as one described in US 2016/0108458 A1 or Frei et al., "Highly multiplexed simultaneous detection of RNAs and proteins in single cells," *Nat Methods* 13(3):269-75 (2016), which are incorporated herein by reference in their entireties; a PLISH probe or probe set, such as one described in US 2020/0224243 A1 or Nagendran et al., "Automated cell-type classification in intact tissues by single-cell molecular profiling," *eLife* 7: e30510 (2018), which are incorporated herein by reference in their entireties; a RollFISH probe or probe set such as one described in Wu et al., "RollFISH achieves robust quantification of single-molecule RNA biomarkers in paraffin-embedded tumor tissue samples," *Commun Biol* 1, 209 (2018), which is hereby incorporated by reference in its entirety; a MER-FISH probe or probe set, such as one described in US 2022/0064697 A1 or Chen et al., "Spatially resolved, highly multiplexed RNA profiling in single cells," *Science* 348 (6233): aaa6090 (2015), which are incorporated herein by reference in their entireties; a primer exchange reaction (PER) probe or probe set, such as one described in US 2019/0106733 A1, which is hereby incorporated by reference in its entirety.

In some instances, probes and/or probe sets are directly labeled with one or more detectable labels (e.g., an optically detectable label, such as a florescent moiety) that are detected on the opto-fluidic instruments disclosed herein. In other instances, probes and/or probe sets comprise a target binding region and one or more nucleic acid barcode sequences that identify the analyte. In these embodiments, the barcode sequence(s) may be detected on the opto-fluidic instruments disclosed herein to identify the analyte in the sample. In some instances, a probe or probe set disclosed herein is a circularizable probe or probe set (e.g., a padlock probe or padlock-like probe) comprising a barcode region comprising one or more barcode sequences.

The probes and/or probe sets describe herein may comprise any suitable number of barcode sequences. In some embodiments, the probes or probe sets may comprise 1, 2, 3, 4, 5, 6, 7, 8, 9, 10, 11, 12, 13, 14, 15 or more, 20 or more, 30 or more, 40 or more, or 50 or more barcode sequences. As an illustrative example, a first probe may contain a first target-binding sequence, a first barcode sequence, and a second barcode sequence, while a second, different probe may contain a second target-binding sequence (that is different from the first target-binding sequence in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, a labelling agent may include analyte binding moiety that interacts with an analyte (e.g., a protein) in the sample (e.g., a cell or tissue sample) and a reporter oligonucleotide comprising one or more barcode sequences associated with the analyte and/or analyte binding moiety. For example, a labelling agent that is specific to one type of cell feature (e.g., a first protein) may have coupled thereto a first reporter oligonucleotide, while a labelling agent that is specific to a different cell feature (e.g., a second protein) may have a different reporter oligonucleotide coupled thereto. In some embodiments, an analyte binding moiety includes, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. For a description of example labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, the nucleic acid probes, probe sets, reporter oligonucleotides, barcode sequences, etc. may be detected directly on the opto-fluidic instruments disclosed herein (e.g., primary probes comprise a detectable label, such as a florescent moiety), and/or by using secondary (or higher order) nucleic acid probes able to bind to the primary probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase (e.g., a circularized probe in a rolling circle amplification (RCA) reaction), a template or substrate for a ligase, a substrate for a click chemistry reaction, and/or a substrate for a nuclease (e.g., endonuclease or exonuclease for cleavage or digestion). In some instances, labelling agents (such as a primary probe set) are added to a biological sample (e.g., a cell or tissue sample) using the opto-fluidic instrument and subsequently detected using opto-fluidic instrument (e.g., using detectably labeled primary probes, sequential hybridization of detectable labelled oligonucleotides to primary probes, in situ sequencing (e.g., SBS, SBL, SBH, etc.)). In some instances, labelling agents (such as a primary probe set) are added to a biological sample (e.g., a cell or tissue sample) outside the optofluidic instrument and the sample is loaded onto the opto-fluidic instruments disclosed herein for detection (e.g., using sequential hybridization of detectable labelled oligonucleotides, in situ sequencing (e.g., SBS, SBL, SBH, etc.)).

In some embodiments, detection of the analytes, probes, probe sets, barcodes, etc. described herein can be performed in situ on the opto-fluidic instruments disclosed herein. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing approaches are described, for example, in Mitra et al., "Fluorescent in situ sequencing on polymerase colonies" *Anal. Biochem.* 320:55-65 (2003), and Lee et al., "Highly Multiplexed Subcellular RNA Sequencing in situ" *Science,* 343(6177): 1360-1363 (2014). In addition, examples of methods and systems for performing in situ sequencing are described in US 2016/0024555, US 2019/0194709, and in U.S. Pat. Nos. 10,138,509, 10,494,662 and 10,179,932.

In some embodiments, sequencing can be performed by sequencing-by-synthesis (SBS). In some embodiments, a sequencing primer is complementary to sequences at or near the target to be detected (e.g., one or more barcode(s)). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/0059865, US 2005/0100900, U.S. Pat. No. 9,217,178, US 2009/0118128, US 2012/0270305, US 2013/0260372, and US 2013/0079232.

In some embodiments, sequence analysis of nucleic acids (e.g., nucleic acids such as RCA products comprising barcode sequences) can be performed by sequential hybridization (e.g., sequencing by hybridization and/or sequential in situ fluorescence hybridization). Sequential fluorescence hybridization can involve sequential hybridization of detection probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, MERFISH (described for example in Moffitt et al., "Chapter One—RNA Imaging with Multiplexed Error-Robust Fluorescence In situ Hybridization (MERFISH)" *Methods in Enzymology,* 572:1-49 (2016)), and hybridization-based in situ sequencing (HybISS) (described for example in Gyllborg et al., "Hybridization-based in situ sequencing (HybISS) for spatially resolved transcriptomics in human and mouse brain tissue," *Nucleic Acids Res* 48(19):e112 (2020)) all of which are incorporated herein by reference.

In some embodiments, sequencing can be performed using sequencing by ligation (SBL). Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al., "Accurate Multiplex Polony Sequencing of an Evolved Bacterial Genome," *Science,* 309:1728-1732 (2005), and in U.S. Pat. Nos. 5,599,675; 5,750,341; 6,969,488; 6,172,218; and 6,306,597. Exemplary techniques for in situ SBL comprise, but are not limited to, STARmap (described for example in Wang et al., "Three-dimensional intact-tissue sequencing of single-cell transcriptional states," *Science,* 361(6499):5691 (2018)) and US 2021/0164039).

In some embodiments, probe barcodes (e.g., plurality of probes or probe sets comprising one or more barcode sequences) or complements or products thereof are targeted by detectably labeled detection oligonucleotides, such as fluorescently labeled oligonucleotides. In some embodiments, one or more decoding schemes (e.g., sequential rounds of fluorescent probe hybridization) are used on the opto-fluidic instruments disclosed herein to decode the signals, such as fluorescence, for sequence identification. In any of the embodiments herein, barcodes (e.g., primary and/or secondary barcode sequences) can be analyzed (e.g., detected or sequenced using the opto-fluidic instruments disclosed herein) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides or detectable probes). Exemplary decoding schemes are described in Eng et al., "Transcriptome-scale Super-Resolved Imaging in Tissues by RNA SeqFISH+," *Nature* 568(7751):235-239 (2019); Chen et al., *Science;* 348(6233):aaa6090 (2015); Gyllborg et al., *Nucleic Acids Res* 48(19):e112 (2020); U.S. Pat. No. 10,457,980 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids used for establishing the experimental conditions for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

Accordingly, various embodiments encompassed herein relate to a machine vision system that can be used to calibrate various motion control systems/components that can be used for precise and reliable positioning various instrumental components of the imaging system/tool configured imaging of biological specimens. In accordance with various embodiments, the disclosed machine vision system can be implemented in systems or tools that utilize calibration or performing precise and reliable positioning functions of various motion control systems/components as described further below.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

Descriptions and examples of various terms, as used herein, are provided in Section II below.

II. Example Descriptions of Terms

As used herein the specification, "a" or "an" may mean one or more. As used herein in the claim(s), when used in conjunction with the word "comprising," the words "a" or "an" may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

The use of the term "or" in the claims is used to mean "and/or" unless explicitly indicated to refer to alternatives only or the alternatives are mutually exclusive, although the disclosure supports a definition that refers to only alternatives and "and/or." For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment. As used herein "another" may mean at least a second or more.

The term "ones" means more than one.

As used herein, the term "plurality" may be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In some cases, "at least one of item A, item B, or item C" means, but is not limited to, two of item A, one of item B, and ten of item C; four of item B and seven of item C; or some other suitable combination.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

As used herein, the term "about" refers to include the usual error range for the respective value readily known. Reference to "about" a value or parameter herein includes (and describes) embodiments that are directed to that value or parameter per se. For example, description referring to "about X" includes description of "X". In some embodiments, "about" may refer to ±15%, ±10%, ±5%, or ±1% as understood by a person of skill in the art.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present embodiment. Thus, the appearances of the foregoing phrases in various places throughout this specification are not necessarily all referring to the same embodiment. Furthermore, the particular features, structures, or characteristics may be combined in any suitable manner in various embodiments.

III. Overview of an Opto-Fluidic Instrument

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 is configured to facilitate the experimental conditions conducive for the detection of the target molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample 110 (e.g., by an imaging system of the optics module 150). In various embodiments, the various modules of the opto-fluidic instrument 120 may be separate components. In various embodiments, the various modules of the opto-fluid instrument may be in electrical communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in U.S. application Ser. No. 18/328,200, filed Jun. 2, 2023, titled "Methods, Systems, and Devices for Sample Interface," which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, probe reagents, etc., and such reagents may be provided by the fluidics module 140. Examples of the washing buffer include but are not limited to deionized water, phosphate-buffered saline (PBS), PBS with dimethyl sulfoxide (DMSO), etc. The stripping buffer can be but is not limited to DMSO, a surfactant, etc. In some instances, the surfactant can be or include polysorbate 20. In some instances, the stripping buffer may include the surfactant in a weight proportion of about 0.1%. The probe reagent can be fluorescent probes, such as but not limited to oligonucleotide probes.

In various embodiments, the fluidics module 140 may include one or more components that may be used for storing the reagents, as well as for transporting said reagents to and from the sample device containing the sample 110. For example, the fluidics module 140 may include one or more reservoirs or reagent bottles configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate).

Further, the fluidics module 140 may also include pumps, tubes, pipettes, etc., that are configured to facilitate the transport of the one or more reagents (such non-limiting examples may include high use reagent and/or low use reagent) to the sample device and thus contact the sample 110 with the reagent (such non-limiting examples may include high use reagent and/or low use reagent). For instance, the fluidics module 140 may include one or more pumps ("reagent pumps") that are configured to pump washing and/or stripping reagents (i.e., high use reagents) to the sample device for use in washing and/or stripping the sample 110. In various embodiments, the fluidics module 140 may be configured for other washing functions such as washing an objective lens of the imaging system of the optics module 150). In some embodiments, a stage (e.g., a Y-Z stage) may be configured to move the pipettes, tubes, etc., along one or more directions, to and from the sample device containing the sample 110, so that the various reagents may be dispensed in the sample device, and spent reagents may be extracted from the sample device.

In various embodiments, the ancillary module 170 includes a cooling system (i.e., a heat transfer system) of the opto-fluidic instrument 120. In various embodiments, the cooling system includes a network of coolant-carrying tubes configured to transport coolant to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to one or more components of the opto-fluidic instrument 120 so as to cool said one or more components. For one non-limiting example, the ancillary module 170 may include cooling fans that are configured to directly cool by forcing ambient air past the system controller 130 to thereby cool the system controller 130.

As discussed above, the opto-fluidic instrument 120 may include an optics module 150 which include the various optical components of the opto-fluidic instrument 120, such as but not limited to a camera, an illumination module (such non-limiting examples may include one or more LEDs and/or one or more lasers), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150.

In various embodiments, the system controller 130 may be configured to control the operations of the opto-fluidic instrument 120 (e.g., and the operations of one or more modules thereof). In some embodiments, the system controller 130 may take various forms, including a processor, a single computer (or computer system), or multiple computers in communication with each other. In various embodiments, the system controller 130 may be communicatively coupled with a data storage, a set of input devices, display system, or a combination thereof. In various embodiments, some or all of these components may be considered to be part of or otherwise integrated with the system controller 130, may be separate components in communication with each other, or may be integrated together. In other embodiments, the system controller 130 can be, or may be in communication with, a cloud computing platform.

In various embodiments, the opto-fluidic instrument 120 may analyze the sample 110 and generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may perform a plurality of probing rounds on the sample 110. During the plurality of probing rounds, the sample 110 undergoes successive rounds of fluorescent probe hybridization (using two or more sets of fluorescent probes, where each set of fluorescent probes is excited by a different color channel) and is volumetrically imaged in a plurality of z-stacks to detect target molecules in the probed sample 110 in three dimensions. In such cases, the output 190 may include a plurality of light signals at specific three-dimensional locations over the plurality of probing cycles. In various embodiments, an optical signature (e.g., a codeword) specific to each gene is determined from the detected optical signals at each three-dimensional location across the plurality of probing cycles, which allows the identification of the target molecules.

Figure 2:
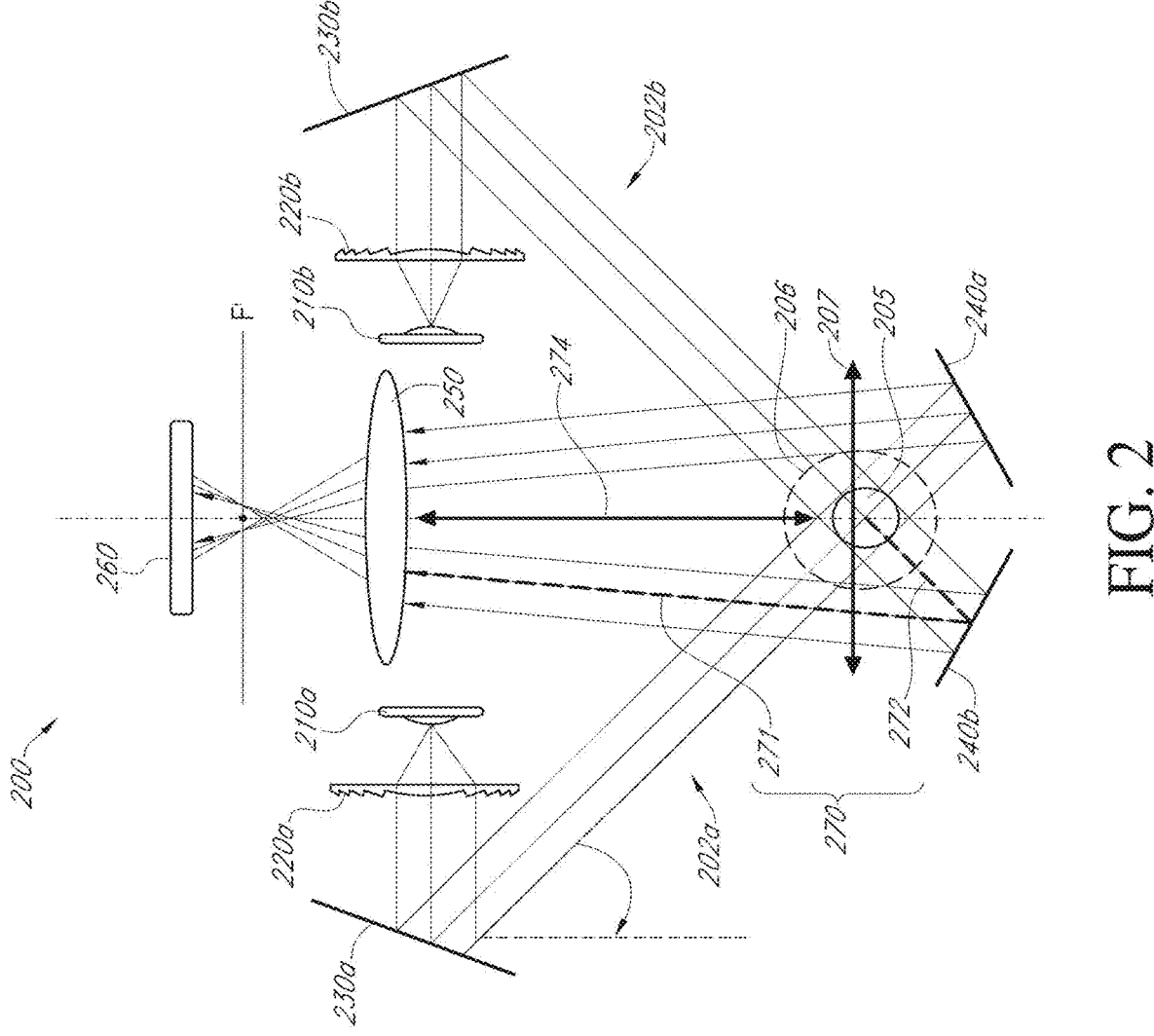
FIG. 2 illustrates a schematic diagram of an optical assembly for machine vision calibration, in accordance with various embodiments.

FIG. 2 illustrates a schematic diagram of an optical assembly 200, in accordance with various embodiments. As disclosed herein, the optical assembly 200 can be used as, or part of, a machine vision system, in accordance with various embodiments. In various embodiments, the optical assembly 200 and/or the machine vision system can be implemented within an analytical system, such as, for example, an opto-fluidic instrument configured for imaging of biological specimens. Opto-fluidic instrument 120 of FIG. 1 is one non-limiting example of such an opto-fluidic instrument. In various embodiments, the optical assembly 200 can be configured to capture a plurality of stereo-images of an object 205. In various embodiments, the plurality of stereo-images can be used to determine 3D positions, movement, and/or trajectory of the object 205.

As shown in FIG. 2, the optical assembly 200 includes one or more light sources (e.g., first light source 210a, second light source 210b), one or more collimating lenses (e.g., first collimating lens 220a, second collimating lens 220b), one or more mirrors (e.g. first folding mirror 230a, second folding mirror 230b), one or more imaging mirrors (first imaging mirror 240a, second imaging mirror 240b), one or more focusing lens 250, and one or more sensor array 260 for imaging the object 205. For example, a first light beam 202a can be output from the first light source 210a, which then propagates through the first collimating lens 220a and arrives at the first folding mirror 230a, which then reflects the first light beam 202a towards the object 205 and the first imaging mirror 240a, thereby illuminating the object 205. The first imaging mirror 240a then reflects the first light beam 202a (with a shadow/silhouette of the object 205) towards the focusing lens 250, which then collects and focuses the light onto the sensor array 260 to form a portion of the stereo-image. Similarly, a second light beam 202b can be output from the second light source 210b, which then propagates through the second collimating lens 220b and arrives at the second folding mirror 230b, which then reflects the second light beam 202b towards the object 205 and the second imaging mirror 240b, thereby illuminating the object 205. The second imaging mirror 240b then reflects the second light beam 202b (with another shadow/silhouette of the object 205 from a different angle than the first shadow/silhouette) towards the focusing lens 250, which then collects and focuses the light onto the sensor array 260 to form a second portion of the stereo-image. In doing so, the stereo-image can be generated via the sensor array 260 based on the light captured via the first light beam 202a and the second light beam 202b, in accordance with various embodiments. In various embodiments, the optical assembly 200 includes a first sensor array configured to receive the first light beam 202a and a second sensor array configured to receive the second light beam 202b. In various embodiments, each sensor array 260 has a focusing lens 250.

In various embodiments, the first light beam 202a and the second light beam 202b intersect one another at an intersection angle within an intersection region 206. In various embodiments, the first light beam 202a and the second light beam 202b are orthogonal or substantially orthogonal to one another. In various embodiments, the intersection angle is about 45 degrees to about 135 degrees. In various embodiments, the intersection angle is about 70 degrees to about 110 degrees. In various embodiments, the intersection angle is about 90 degrees.

As illustrated in FIG. 2, the object 205 can be positioned along an axis/plane 207, which effectively constrains the movement of the object 205 to the axis/plane 207 so as to keep the object 205 in a desired focus during imaging. In various embodiments, the focusing lens 250 has a imaging working distance 270, which is a combination of a a first distance value 271 from the sensor array 260 to the second imaging mirror 240b, and a a second distance value 272 from the second imaging mirror 240b and the object 205. In various embodiments, the imaging working distance 270 of the focusing lens 250 is about 20 mm to about 500 mm. In various embodiments, the imaging working distance 270 of the focusing lens 250 is about 20 mm to about 300 mm. In various embodiments, the imaging working distance 270 of the focusing lens 250 is about 100 mm to about 300 mm. In various embodiments, the imaging working distance 270 of the focusing lens 250 is about 100 mm to about 200 mm. In various embodiments, the imaging working distance 270 of the focusing lens 250 is about 125 mm to about 175 mm. In various embodiments, the imaging working distance 270 of the focusing lens 250 is about 150 mm to about 160 mm. In various embodiments, the imaging working distance 270 of the focusing lens 250 is about 153 mm. In various embodiments, the imaging working distance 270 of the focusing lens 250 is about 152 mm. In various embodiments, the imaging working distance 270 of the focusing lens 250 is about 151 mm. In various embodiments, the imaging working distance 270 of the focusing lens 250 is about 150 mm.

In various embodiments, the focusing lens 250 has a focal length F'. In various embodiments, the focal length F' is about 10 mm to about 100 mm. In various embodiments, the focal length F' is about 10 mm to about 90 mm. In various embodiments, the focal length F' is about 10 mm to about 80 mm. In various embodiments, the focal length F' is about 10 mm to about 70 mm. In various embodiments, the focal length F' is about 10 mm to about 60 mm. In various embodiments, the focal length F' is about 10 mm to about 50 mm. In various embodiments, the focal length F' is about 10 mm to about 40 mm. In various embodiments, the focal length F' is about 10 mm to about 30 mm. In various embodiments, the focal length F' is about 20 mm to about 60 mm. In various embodiments, the focal length F' is about 20 mm to about 30 mm. In various embodiments, the focal length F' is about 25 mm. A non-limiting example of a focusing lens 250 used in a machine vision calibration system is a 25 mm FL f/8, Blue Series M12 Lens.

In various embodiments, the optical assembly 200 can include a single light source 210a that is configured to generate both light beams 202a, 202b. In various embodiments, the one or more light sources 210a, 210b may include one or more light emitting diodes (LEDs).

In various embodiments, the optical assembly 200 includes light sources 210a, 210b configured to generate the first light beam 202a and the second light beam 202b that intersects the first light beam 202a at the intersection region 206 to illuminate the object 205 within the intersection region 206. In various embodiments, the optical assembly 200 includes the sensor array 260 configured to receive the first light beam 202a and the second light beam 202b to thereby form a stereo-image based on received light from the first light beam 202a and the second light beam 202b. In various embodiments, the optical assembly 200 includes the first imaging mirror 240a configured to reflect the first light beam 202a after the intersection region 206 and towards the sensor array 260, and the second imaging mirror 240b configured to reflect the second light beam 202b after the intersection region 206 and towards the sensor array 260.

In various embodiments, the first imaging mirror 240a and the second imaging mirror 240b are positioned behind the object 205 opposite light sources 210a, 210b, and/or the sensor array 260. In various embodiments, the first imaging mirror 240a and the second imaging mirror 240b are oriented such that a surface normal to a mirror surface of the first imaging mirror 240a is oriented at an angle between 90° and 180° from a surface normal to a mirror surface of the second imaging mirror 240b. In various embodiments, the first imaging mirror 240*a* and the second imaging mirror 240*b* can be mounted on a single optical mount.

In various embodiments, the first light beam 202*a* and the second light beam 202*b* are parallel to a same plane as the first imaging mirror 240*a*, the second imaging mirror 240*b*, and the sensor array 260.

In various embodiments, the focusing lens 250 can be configured to collect and focus reflected light from the first imaging mirror 240*a* to a first portion (not shown) of the sensor array 260 and from the second imaging mirror 240*b* to a second portion (not shown) of the sensor array 260. In various embodiments, a depth of field (DOF) of the focusing lens 250 is equal to or larger than a width or a diameter of the object 205 such that an entirety of the object 205 can be in focus or substantially in focus in the formed stereo-image. In various embodiments, the imaging working distance 270 of the focusing lens 250 is larger than a physical working distance 274 between the object 205 and the focusing lens 250 such that a surface of the object 205 facing the sensor array 260 (or the focusing lens 250) is not captured in the stereo-image. In various embodiments, the imaging working distance 270 is larger than the physical working distance 274 between the object 205 and the focusing lens 250 such that a surface of the object 205 facing away from the sensor array 260 (or the focusing lens 250) is captured in the stereo-image via a reflection from the first imaging mirror 240*a* or the second imaging mirror 240*b*. In various embodiments, the image captured of the object 205 is a negative image.

In various embodiments, the imaging working distance 270 of the focusing lens 250 is equal to or substantially equal to a combined distance of the two distance values 271 and 272. In various embodiments, first distance value 271 is measured between the sensor array 260 and the first imaging mirror 240*a* (or the second imaging mirror 240*b*), and second distance value 272 is measured between the first imaging mirror 240*a* (or the second imaging mirror 240*b*) and the object 205. In various embodiments, the first distance value 271 is about 10 mm to about 400 mm. In various embodiments, the first distance value 271 is about 10 mm to about 350 mm. In various embodiments, the first distance value 271 is about 10 mm to about 300 mm. In various embodiments, the first distance value 271 is about 10 mm to about 250 mm. In various embodiments, the first distance value 271 is about 10 mm to about 200 mm. In various embodiments, the first distance value 271 is about 10 mm to about 150 mm. In various embodiments, the first distance value 271 is about 10 mm to about 100 mm. In various embodiments, the first distance value 271 is about 50 mm to about 200 mm. In various embodiments, the first distance value 271 is about 100 mm to about 150 mm. In various embodiments, the first distance value 271 is about 75 mm to about 150 mm. In various embodiments, the second distance value 272 is about 5 mm to about 200 mm. In various embodiments, the second distance value 272 is about 5 mm to about 150 mm. In various embodiments, the second distance value 272 is about 5 mm to about 100 mm. In various embodiments, the second distance value 272 is about 5 mm to about 50 mm. In various embodiments, the second distance value 272 is about 5 mm to about 40 mm. In various embodiments, the second distance value 272 is about 5 mm to about 30 mm. In various embodiments, the second distance value 272 is about 5 mm to about 20 mm. In various embodiments, the second distance value 272 is about 5 mm to about 10 mm.

In various embodiments, the physical working distance 274 is about 10 mm to about 300 mm. In various embodiments, the physical working distance 274 is about 10 mm to about 250 mm. In various embodiments, the physical working distance 274 is about 10 mm to about 200 mm. In various embodiments, the physical working distance 274 is about 10 mm to about 150 mm. In various embodiments, the physical working distance 274 is about 10 mm to about 100 mm. In various embodiments, the physical working distance 274 is about 50 mm to about 200 mm. In various embodiments, the physical working distance 274 is about 50 mm to about 150 mm. In various embodiments, the physical working distance 274 is about 100 mm to about 200 mm. In various embodiments, the physical working distance 274 is about 100 mm to about 150 mm. In various embodiments, the physical working distance 274 is about 120 mm to about 140 mm. In various embodiments, the physical working distance 274 is about 130 mm.

In various embodiments, the first folding mirror 230*a* is configured to redirect the first light beam 202*a* from light source 210*a* onto the object 205 and/or the first imaging mirror 240*a*. In various embodiments, the second folding mirror 230*b* is configured to redirect the second light beam 202*b* from light source 210*b* onto the object 205 and/or the second imaging mirror 240*b*. In various embodiments, the first collimating lens 220*a* is configured to collimate the first light beam 202*a* from light source 210*a* onto the object 205 and/or the first imaging mirror 240*a*. In various embodiments, the second collimating lens 220*b* is configured to collimate the second light beam 202*b* from light source 210*b* onto the object 205 and/or the second imaging mirror 240*b*.

In various embodiments, an image parameter of the stereo-image formed at the first portion of the sensor array 260 may be identical or substantially identical to an image parameter of the stereo-image formed at the second portion of the sensor array 260 such that a contrast value and/or a brightness value of the stereo-image are within a predetermined threshold.

Figure 3:
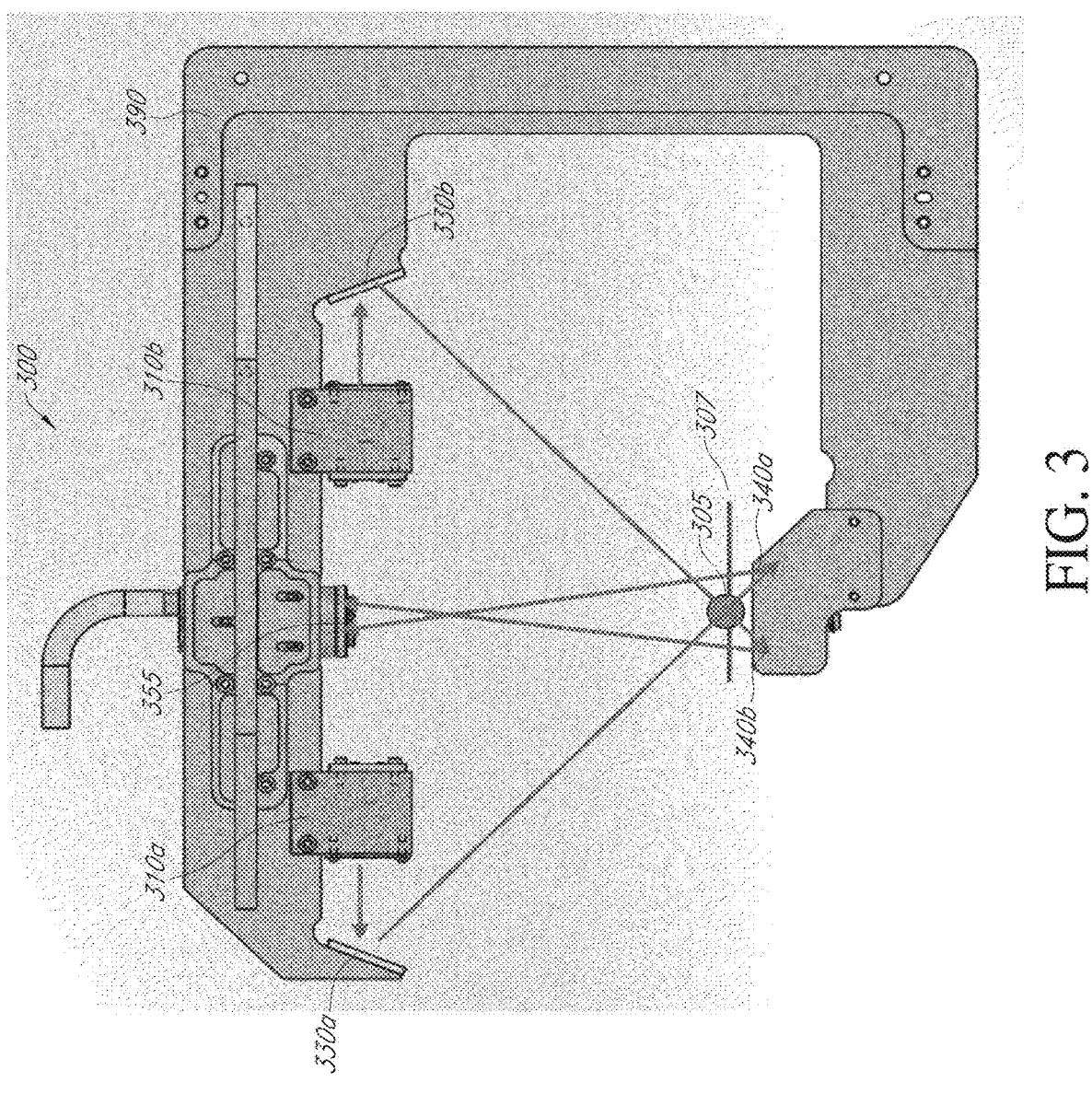
FIG. 3 illustrates a schematic diagram of an optical assembly for machine vision calibration, in accordance with various embodiments.

In various embodiments, the focusing lens 250 and the sensor array 260 can be packaged as a camera, such as camera 355 as shown in FIG. 3. In various embodiments, the optical assembly 200 can be part of a machine vision system, which may include a computing node. One non-limiting example of such a computing node may be a computer system 1300 as described below with respect to FIG. 13. In various embodiments, the computer system 1300 may be coupled to the optical assembly 200 and can be configured for processing one or more stereo-images received from the sensor array 260 to determine, for example, a three-dimensional position, a three-dimensional location, and/or a trajectory of the object 205 based on the captured stereo-images. In various embodiments, the stereo-images may be analyzed via an algorithm as described herein to extract location information and/or movement information of the object 205 in real-time.

FIG. 3 illustrates a schematic diagram of an optical assembly 300, in accordance with various embodiments. As disclosed herein, the optical assembly 300 can be used as, or part of, a machine vision system, in accordance with various embodiments. In various embodiments, the optical assembly 300 and/or the machine vision system can be implemented within an opto-fluidic instrument configured for imaging of biological specimens. Opto-fluidic instrument 120 of FIG. 1 is one non-limiting example of such an opto-fluidic instrument. In various embodiments, the optical assembly 300 can be configured to capture a plurality of stereo-images (not shown) of an object 305. In various embodiments, the plurality of stereo-images can be used to determine 3D positions, movement, and/or trajectory of the object 305.

As shown in FIG. 3, the optical assembly 300 includes light sources 310*a*, 310*b*, folding mirrors 330*a*, 330*b*, imaging mirrors 340*a*, 340*b*, a camera 355 for imaging the object 305. In various embodiments, the camera 355 can include a focusing lens (not shown) attached to a sensor array (not shown). In various embodiments, the focusing lens has a focal length, which can be referred to herein as a focal length of the camera 355.

As illustrated in FIG. 3, the camera 355 is configured to capture a first light beam from the first light source 310*a*, which is reflected via the first folding mirror 330*a* and the first imaging mirror 340*a* to cast light on the object 305. The first light beam with a shadow/silhouette of the object 305 captured at a first portion of the camera 355 forms a first portion of the stereo-image (not shown). Similarly, the camera 355 is configured to capture a second light beam from the second light source 310*b*, which is reflected via the second folding mirror 330*b* and the second imaging mirror 340*b* to cast light on the object 305. The second light beam with a shadow/silhouette of the object 305 captured at a second portion of the camera 355 forms a second portion of the stereo-image. In doing so, the stereo-image can be generated via the camera 355 based on the light captured via the first light beam and the second light beam, in accordance with various embodiments.

In various embodiments, light sources 310*a*, 310*b*, folding mirrors 330*a*, 330*b*, imaging mirrors 340*a*, 340*b*, and the camera 355 of the optical assembly 300 can be mounted on a frame 390. In various embodiments, the frame 390 ensures that all the components, namely, light sources 310*a*, 310*b*, folding mirrors 330*a*, 330*b*, imaging mirrors 340*a*, 340*b*, and the camera 355 are mounted such that first light beam and second light beam are on a single plane.

As illustrated in FIG. 3, the object 305 can be positioned anywhere along an axis/plane 307, which effectively constrains the movement of the object 305 to the axis/plane 307 so as to keep the object 305 in a desired focus during imaging.

In various embodiments, the one or more light sources 310*a*, 310*b* may include one or more light emitting diodes (LEDs). In various embodiments, the optical assembly 300 can be part of a machine vision system, which may include a computing node. One such non-limiting example of a computer node may be computer system 1300 as described below with respect to FIG. 13. In various embodiments, the computer system 1300 may be coupled to the optical assembly 300 and can be configured for processing one or more stereo-images received from the camera 355 to determine, for example, a three-dimensional position, a three-dimensional location, and/or a trajectory of the object 305 based on the captured stereo-images. In various embodiments, the stereo-images may be analyzed via an algorithm as described herein to extract location information and/or movement information of the object 305 in real-time.

Figure 4:
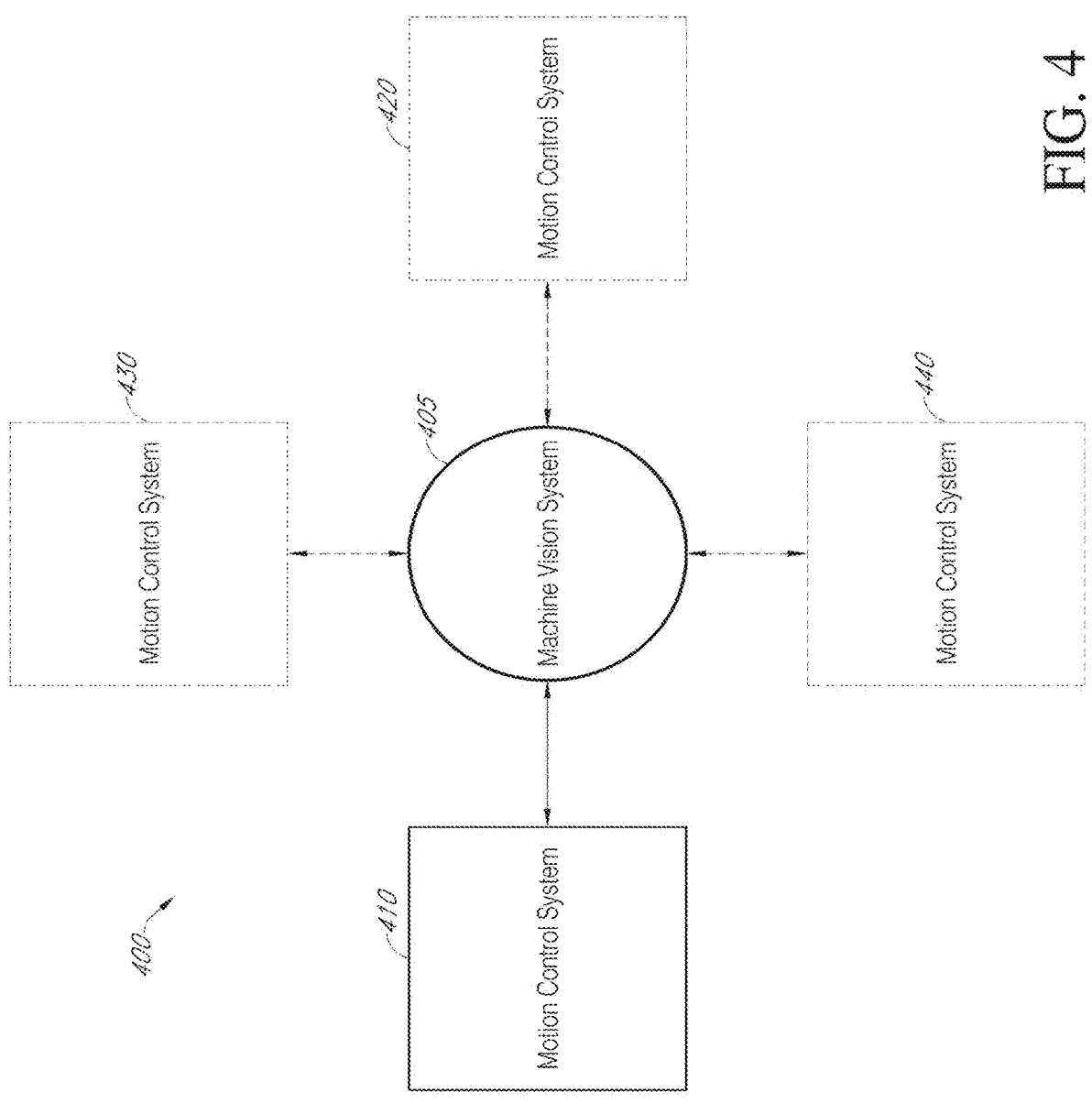
FIG. 4 depicts a schematic illustration of a machine vision system for calibrating one or more motion control systems, in accordance with various embodiments.

FIG. 4 depicts a schematic illustration 400 of a machine vision system for calibrating one or more motion control systems, in accordance with various embodiments. As illustrated in FIG. 4, machine vision system 405 can be used for calibrating one or more motion control systems 410, 420, 430, 440. In accordance various embodiments, the machine vision system 405 may include an optical assembly. Two such non-limiting examples of such an optical assembly may include optical assembly 200, and/or optical assembly 300 as described, respectively, with respect to FIGS. 2 and 3. In various embodiments, the optical assembly of the machine vision system 405 may be configured to capture one or more stereo-images of an object. Two such non-limiting examples of an object may include object 205 and/or object 305 as described, respectively, with respect to FIGS. 2 and 3.

In various embodiments, a (2D or 3D) position, a movement, and/or a trajectory of the object, which can be a tip, a pipette tip, a target probe, etc., can be controlled by one or more motion control systems 410, 420, 430, and/or 440. By using machine vision system 405, the actuation mechanism, such as a linear motor, a linear stage, a translation stage, etc., of the one or more motion control systems 410, 420, 430, and/or 440 for positioning or moving the object 305 can be calibrated. For example, if a motion control system 410, 420, 430, and/or 440 is configured for dispensing or extracting a fluid, a used pipette tip may be replaced with a new one when a new experiment is to be performed. In some cases, the new pipette tip may not have an identical shape as the used one, and in such instances, to ensure the tip location is precisely placed at the desired location, the motion control system 410, 420, 430, and/or 440 may be calibrated such that every new pipette tip is positioned accurately at the desired location in 3D space. In such instances, the machine vision system 405 may be used to "mark" the desired location in 3D space in its coordinate system such that the position of the new pipette tip may be corrected so that it is positioned at the desired location.

In various embodiments, the motion control system 410, 420, 430, and/or 440 may be configured to move a stage along two orthogonal axes. In some cases, the stage may be configured to hold a sample, such as a biological specimen. In various embodiments, the stage can be mounted on a first linear stage that moves along a first axis and the first linear stage is mounted on a second linear stage that is configured to move along a second axis. In such cases, the machine vision system 405 may be used to ensure the stage is positioned precisely at the desired location by calibrating the two linear stages. In such instances, the machine vision system 405 may be used in positioning the stage accurately at the desired location in 3D space.

Figures 5A, 5B:
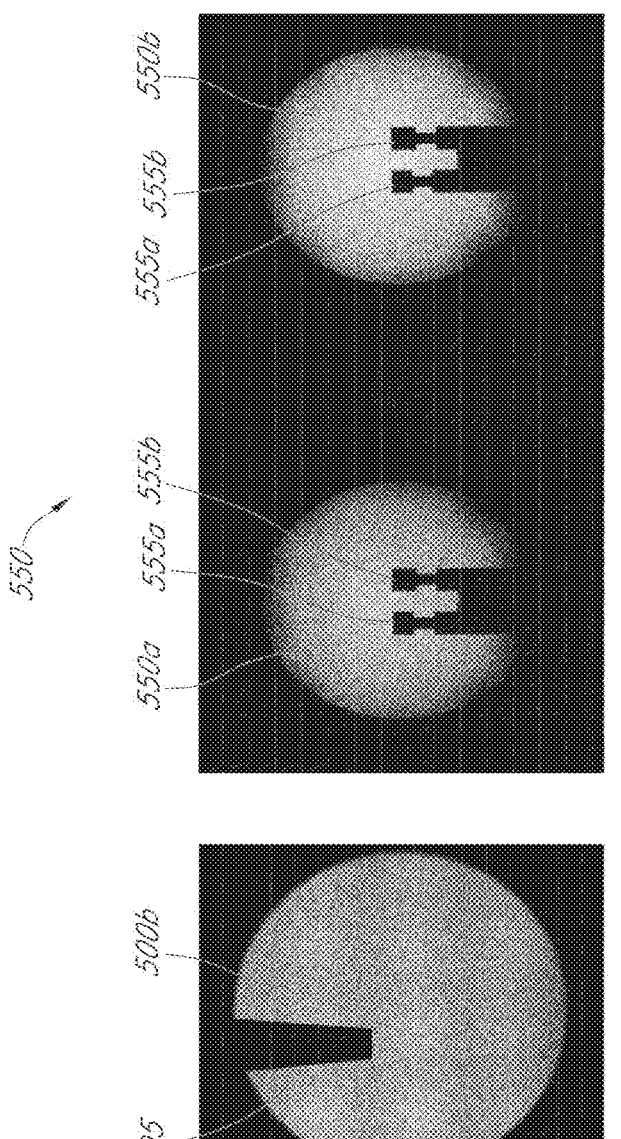
FIG. 5A shows an example stereo-image of an object, in accordance with various embodiments.
FIG. 5B shows an example stereo-image of a set of objects, in accordance with various embodiments.

FIG. 5A shows an example stereo-image 500 of an object 505, in accordance with various embodiments. In various embodiments, the object 505 may be a pipette tip of a motion control system. Non-limiting examples of such motion control systems may include but are not limited to motion control systems 410, 420, 430, and/or 440 from FIG. 4. As illustrated in FIG. 5A, the stereo-image 500 includes a first portion 500*a* and a second portion 500*b*, both of which show the object 505. In various embodiments, the stereo-image 500 may be captured using an optical assembly. Two non-limiting examples of such an optical assembly may include but are not limited to optical assembly 200 and/or optical assembly 300 as described, respectively, with respect to FIGS. 2 and 3.

FIG. 5B shows an example stereo-image 550 of a set of objects 555*a* and 555*b*, in accordance with various embodiments. In various embodiments, the set of objects 555*a* and 555*b* are probe tips used in calibrating a 2-axis movement of a stage of a motion control system. Non-limiting examples of such a motion control systems may include but are not limited to motion control systems 410, 420, 430, and/or 440 from FIG. 4. As illustrated in FIG. 5B, the stereo-image 550 includes a first portion 550*a* and a second portion 550*b*, both of which show the set of objects 555*a* and 555*b*. In various embodiments, the set of objects 555*a* and 555*b* can be used one at a time to calibrate a 3D position, a 3D plane, or movement of the stage. In various embodiments, the stereo-image 550 may be captured using an optical assembly. Two non-limiting examples of such an optical assembly may include but are not limited to optical assembly 200 and/or optical assembly 300 as described, respectively, with respect to FIGS. 2 and 3.

Figure 6A:
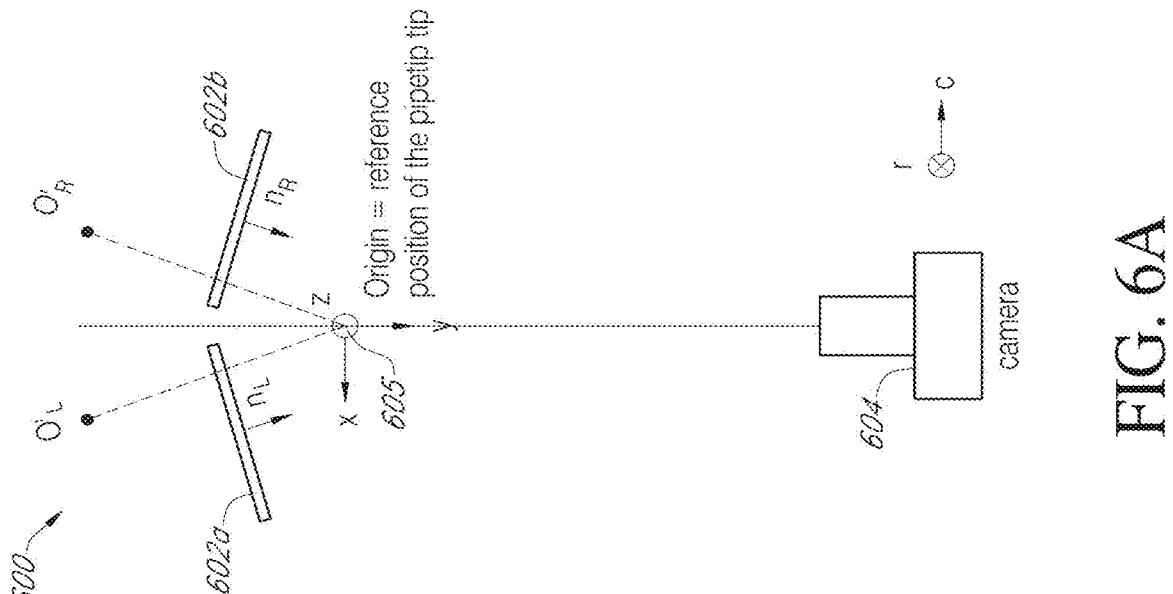
FIG. 6A-6J depict illustrations of machine vision calibration, in accordance with various embodiments.
Figure 6B:
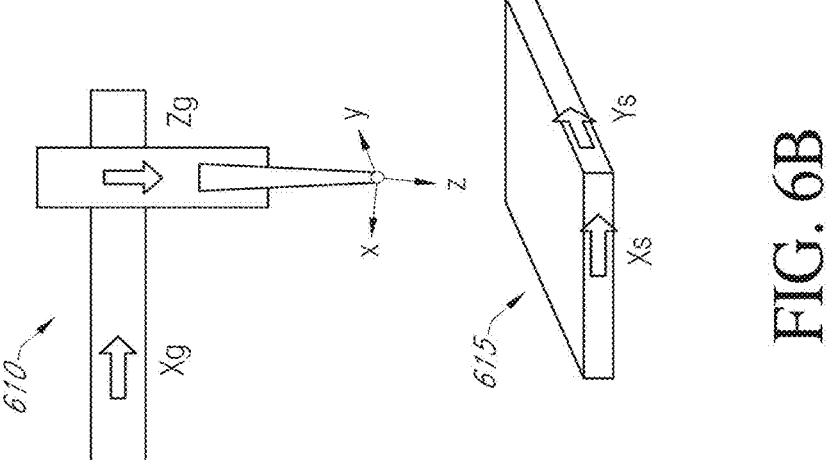
Figure 6C:
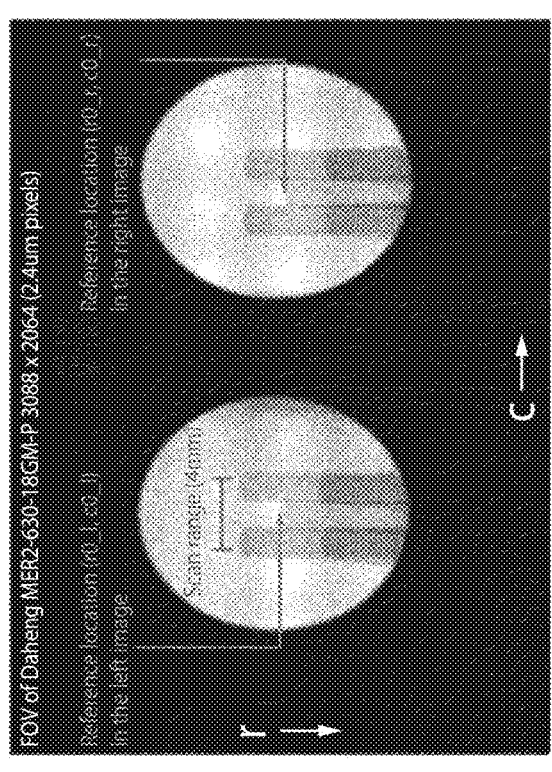

FIGS. 6A-6J depict illustrations of machine vision calibration, in accordance with various embodiments. FIG. 6A illustrates a machine vision coordinate system 600 that includes a camera 604 (or camera sensor), a first (left) mirror 602*a* and a second (right) mirror 602*b*, configured to capture a stereo-image of an object 605. FIG. 6B illustrates a motion control system 610 (also referred to herein as gantry) with two axes $x_g$ and $z_g$ and a motion control system 615 (also referred to herein as stage) with two axes $x_s$ and $y_s$. In various embodiments, the gantry motion control system 610 may be configured to position a pipette tip. In various embodiments, the stage motion control system 615 may be configured to position a stage. FIG. 6C shows a stereo-image 620 with a row 622 and a column 624 in pixels.

Geometry of the machine vision (assembly) coordinate system 600 is as follows: Pipette tip positioning axes $X_g$ and $Z_g$ may be rotationally misaligned with axes x and z of the right-handed coordinate system of the machine vision coordinate system 600. Camera sensor rows increase in the direction of $$-\vec{e_z}.$$

Camera sensor columns increase in the direction of $$-\vec{e_x}.$$

Observed displacements: $O'_L$ and $O'_R$ are reflections of the object in the left and right mirrors, correspondingly. The observed displacements are $O'_L$ and $O'_R$ when the object is displaced by amounts $\delta x_g$, $\delta y_g$, $\delta z_g$ from the origin, in the system of coordinates of positional stages $(X_g, Y_g, Z_g)$. This coordinate system may be rotationally misaligned with the axes of machine vision assembly, but has the same origin:

$O_g \equiv O.$

Displacement of the object in the machine vision coordinates is $$\begin{bmatrix} \delta x \\ \delta y \\ \delta z \end{bmatrix} = \begin{bmatrix} \cos\theta & 0 & -\sin\theta \\ \sin\theta\sin\psi & \cos\psi & \cos\theta\sin\psi \\ \sin\theta\cos\psi & -\sin\psi & \cos\theta\cos\psi \end{bmatrix} \begin{bmatrix} \delta x_g \\ \delta y_g \\ \delta z_g \end{bmatrix} = R(\theta, \psi)r_g$$

where $\theta$, $\psi$ are pitch and roll relating the rotational misalignment of the machine vision axes and the axes of positional stages, and yaw is neglected. Coordinates of reflection in a mirror are:

$$\begin{bmatrix} \delta x' \\ \delta y' \\ \delta z' \end{bmatrix} = \begin{bmatrix} 1 - 2n_x^2 & -2n_x n_y & -2n_x n_z \\ -2n_x n_y & 1 - 2n_y^2 & -2n_y n_z \\ -2n_x n_z & -2n_y n_z & 1 - 2n_z^2 \end{bmatrix} \begin{bmatrix} \delta x \\ \delta y \\ \delta z \end{bmatrix}$$

where $n_x$, $n_y$, $n_z$ are components of the unit vector normal to a mirror.

Object reflection is observed as a projection on image sensor, and its row and column displacements are:

$$\begin{bmatrix} \delta c \\ \delta r \end{bmatrix} =$$

$$m \begin{bmatrix} 1 - 2n_x^2 & -2n_x n_y & -2n_x n_z \\ -2n_x n_y & -2n_y n_z & 1 - 2n_z^2 \end{bmatrix} R(\theta, \psi) \begin{bmatrix} \delta x_g \\ \delta y_g \\ \delta z_g \end{bmatrix} = mF(n_x, n_y, n_z)R(\theta, \psi)x_g$$

where m is magnification of the optical system. The system is not telecentric, so magnification is a function of working distance, and can be approximated by $$m \approx m_0 \left( 1 + 2\frac{m_0}{f}\delta y' \right)$$

where $\delta y'$ is the reflected object displacement, related to $\delta r_g$ by $$\begin{bmatrix} \delta x' \\ \delta y' \\ \delta z' \end{bmatrix} = F(n_x, n_y, n_z)R(\theta, \psi)\delta r_g$$

$m_0$ is the magnification of the reflected object at zero displacement from the reference position along the optical axis, in sensor pixels per unit object size (px/um); and f is the focal length of the objective. Distance-dependent magnification causes perspective distortion.

Now if K measurements of displacement $[\delta c_L, \delta r_L, \delta c_R, \delta r_R]$ of the stereo-image are made while the object is translated along axes $X_g$, $Z_g$, but remains in the reference plane $\delta y_g = 0$, the unknown machine vision parameters can be found by minimizing the cost function $$\phi(n_{L,x}, n_{L,y}, n_{L,z}, m_{L,0}, n_{R,x}, n_{R,y}, n_{R,z}, m_{R,0}, \theta, \psi) ==$$

$$\left\| \begin{bmatrix} \delta c_L \\ \delta r_L \\ \delta c_R \\ \delta r_R \end{bmatrix} - M \begin{bmatrix} F_L(n_{L,x}, n_{L,y}, n_{L,z}) \\ F_R(n_{R,x}, n_{R,y}, n_{R,z}, m_{R,0}) \end{bmatrix} R(\theta, \psi) \begin{bmatrix} \delta x_g \\ 0 \\ \delta z_g \end{bmatrix} \right\|$$

Where the magnification matrix is $$M = \begin{bmatrix} m_L & 0 & 0 & 0 \\ 0 & m_L & 0 & 0 \\ 0 & 0 & m_R & 0 \\ 0 & 0 & 0 & m_R \end{bmatrix}$$

Minimization is with respect to the unknown vector of machine vision calibration parameters: $P=[n_{L,x}, n_{L,y}, n_{L,z}, m_{L,0}, n_{R,x}, n_{R,y}, N_{R,z}, m_{R,0}, \theta, \psi]$, under the constraint $|n_L|=|n_R|=1$. Indices L and R indicate the parameters related to the left and right mirrors, correspondingly.

Note that the two solutions are possible for each mirror: $n_x > 0$, $n_z \leq 0$ and $n_x < 0$, $n_z \geq 0$. The solutions we are interested in are: $n_{x,L} < 0$, $n_{z,L} \geq 0$ for the left image and $n_{x,R} > 0$, $n_{z,R} \leq 0$ for the right image.

Calibration: Typically the object is translated from one location to the next on a grid in $X_g$ and $Z_g$, and the images are acquired. Object position along $Y_g$ is kept constant during the calibration.

As a result of minimization of the cost function above, we obtain the calibration parameters: components of unit vectors normal to the surfaces of the left and the right mirrors; magnifications of the left and right parts of the image; and pitch and roll that relate the rotational misalignment of the machine vision axes and the axes of positional stages.

Observation angles: Matrix elements determined as a result of the calibration described above allow us to quantify the observation angles. Angle $\alpha_x$ is between the normal to a mirror and the x-axis. Angle $\alpha_z$ is between the normal to the mirror plane and the z axis:

$\alpha_{x,L}=-\arcsin(n_{x,L})$ and $\alpha_{z,L}=\arccos(n_{z,L})$, with the corresponding expression for the right mirror.

Determination of stage displacement from images: The final goal is to determine the displacement of the object from its starting (reference) position based on the stereo-image taken at a current position. The observed displacements of the stereo-image are:

$$\begin{bmatrix} \delta c_L \\ \delta r_L \\ \delta c_B \\ \delta r_R \end{bmatrix} = M \begin{bmatrix} F_L(n_{L,x}, n_{L,y}, n_{L,z}) \\ F_R(n_{R,x}, n_{R,y}, n_{R,z}) \end{bmatrix} R(\theta, \psi) \delta r_g = T(p) \delta r_g$$

where P is the vector of machine vision parameters determined during the calibration, therefore, all elements of the 4×3 transformation matrix T(p) are known.

To find the displacement of the object from the reference position, we measure image displacements and minimize the norm:

$$\left\| \begin{bmatrix} \delta c_L \\ \delta r_L \\ \delta c_B \\ \delta r_R \end{bmatrix} - T(p)\delta r_g \right\| \to 0$$

with respect to object displacement vector $\delta r_g$. In the absence of perspective distortion, i.e., when magnifications are constant, this is an unconstrained least-squares (LSQ) problem that has a closed-form solution:

$$\delta r_g = (T^T T)^{-1} T^T \begin{bmatrix} \delta c_L \\ \delta r_L \\ \delta c_R \\ \delta r_R \end{bmatrix}$$

When perspective distortion cannot be neglected, the vector of object displacements $\delta r_g$ can be found instead by sequential least-squares programming (SLSQP) minimization.

Test results: Images were collected using the optical assembly. Two non-limiting examples of such an optical assembly used to gather the test results may include but are not limited to optical assembly 200 and/or optical assembly 300 from FIG. 2 and FIG. 3 respectively. Such images may be collected by an optical assembly with (25 mm/F8 objective/focusing lens, Lucid monochrome 3088×2064 CMOS, pixel size 2.4 μm, royal blue LED illumination) on a 3D grid (4 mm×4 mm×4 mm; $9^3$=729 locations in total). Pipette tip was attached to the stages $X_g$, $Y_g$, $Z_g$ of the fluidic gantry. The grid was centered on a reference location, $\delta r_g$=0. At this location, the distance along the optical axis from the edge of the pipette tip to the housing is approximately 10.3 mm. The working distance of the objective is approximately 125 mm. Machine vision system was mounted on a vibrationally isolated plate.

The goal of the test is to prove that the calibration based on the images collected when the object stays in a single $X_g$ $Z_g$ plane is adequate for calculation of the object 505 displacement in 3D. Therefore, only those images taken at zero displacement from reference along $Y_g$ were used for calculating the machine vision parameter vector P.

Figure 6D:
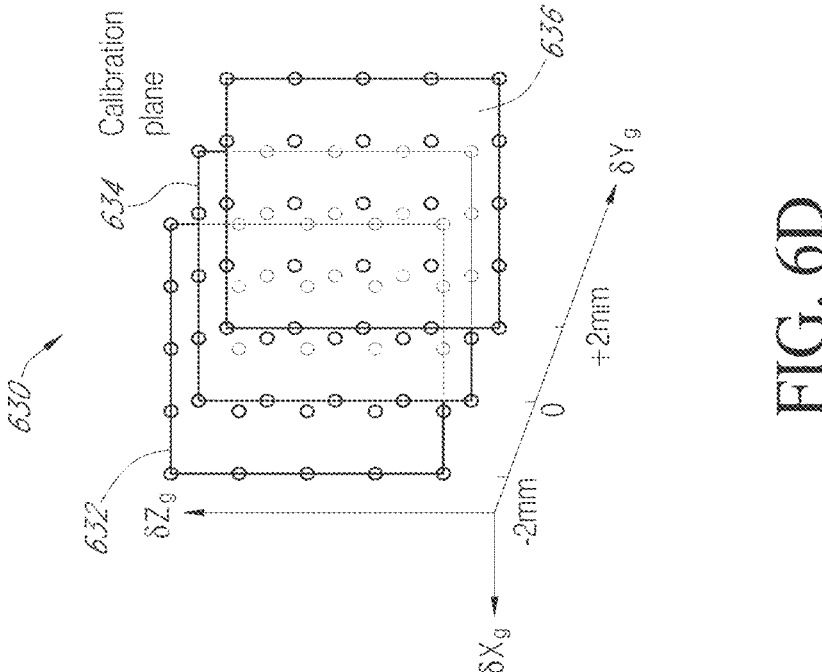

Object locations were then calculated for all stereo-images, including the ones taken at object positions away from the calibration plane 632, 634, and/or 636, as illustrated, for example, in FIG. 6D. FIG. 6D illustrates a plot 630 of calibration planes 632, 634, 636, where stereo-images of the object, such as object 505, are taken.

Figures 6E, 6F:
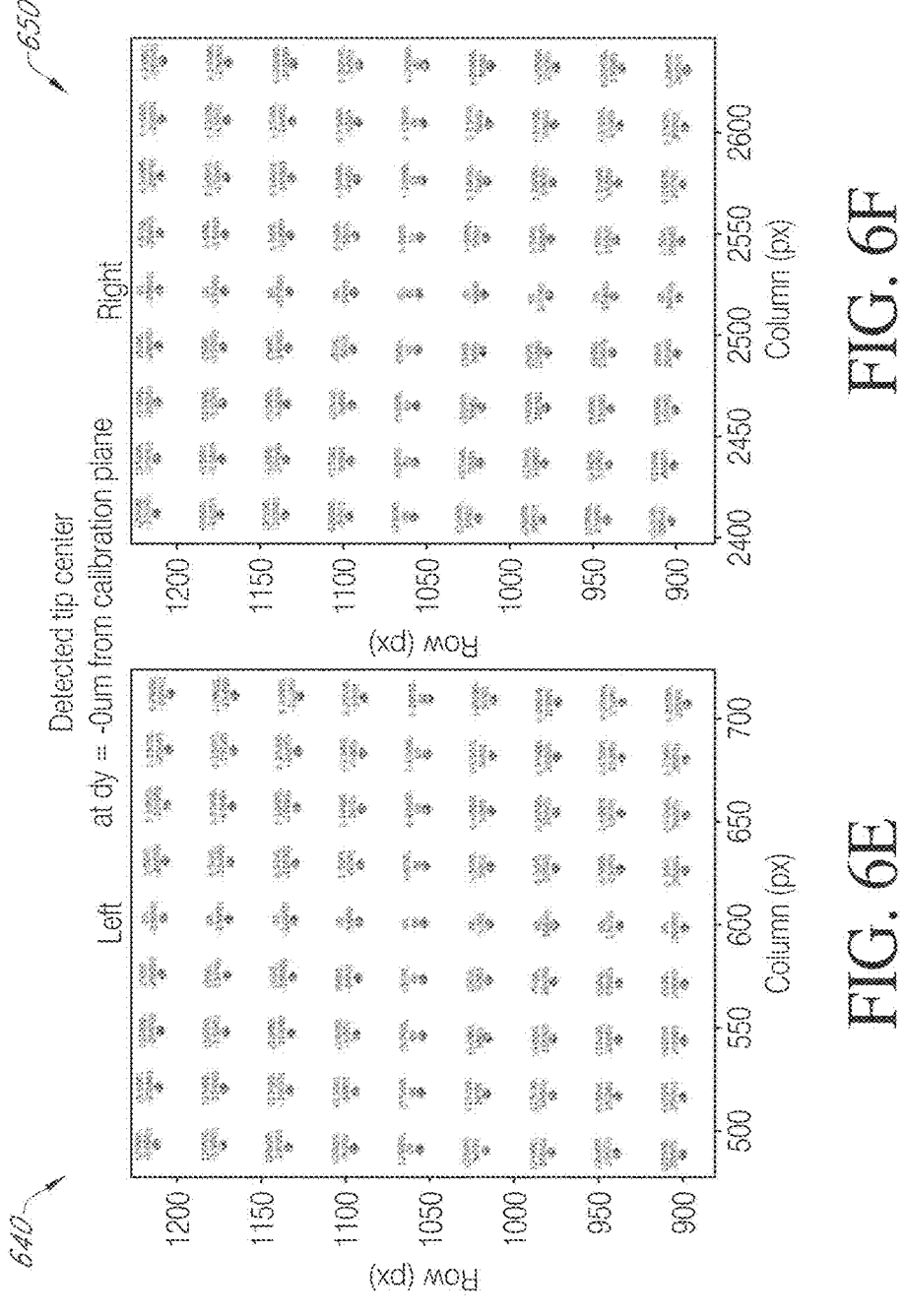

FIGS. 6E and 6F illustrate row and column locations in the stereo-image with image portions 640, and 650. As illustrated, row and column locations (crosses) in the stereo-image are overlaid with the fit (blue circles) based on calibration parameters and known displacements; the object is in the calibration plan. Object displacements ($\delta x_g$, $\delta z_g$) are shown in red. Circle diameter is 4 pixels, which corresponds to 4×12.8=51 μm in object space.

In addition, calculated calibration parameters are as follows:

| left image | |
| --- | --- |
| nx | −0.3809 |
| nz | 0.0031 |
| phi (deg) | 22.390 |
| theta (deg) | 89.823 |
| scale (px/um) | 0.07725 |
| right image | |
| nx | 0.3780 |
| nz | 0.0024 |
| phi (deg) | 22.212 |
| theta (deg) | 89.861 |
| scale (px/um) | 0.07804 |
| pitch (deg) | −1.114 |
| roll (deg) | −0.028 |
| rms error (px) | 0.59 |

Figures 6G, 6H:
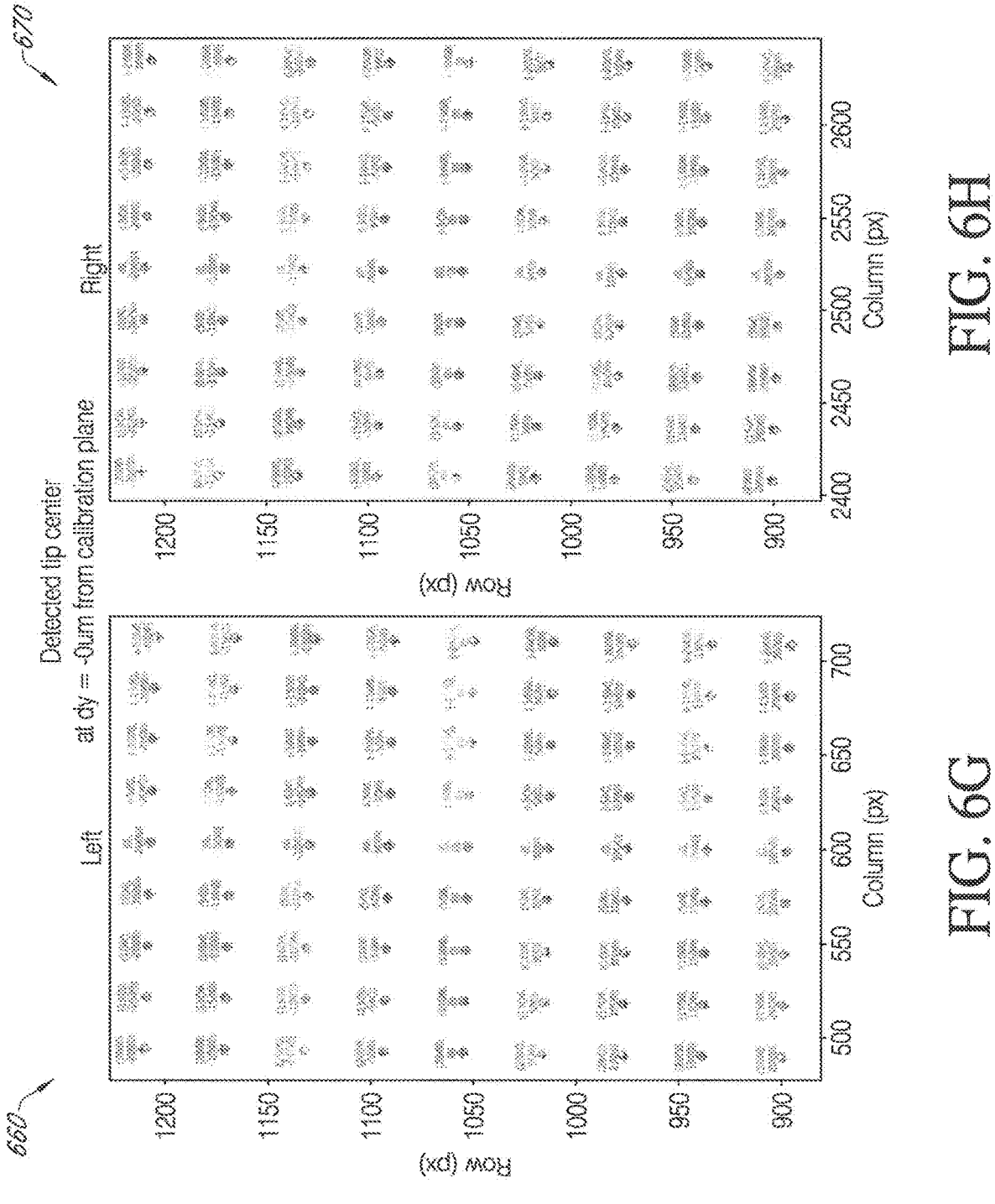

FIGS. 6G and 6H illustrate row and column locations in the stereo-image with image portions 660, 670 with rotational misalignment. The image portions 660, 670 are the result of calibration with only rotational misalignment, but no perspective distortion taken into account:

Calculated calibration parameters (with no correction for perspective distortion) are as follows:

| left image | |
| --- | --- |
| nx | −0.3809 |
| nz | 0.0031 |
| phi (deg) | 22.390 |
| theta (deg) | 89.823 |
| scale (px/um) | 0.07725 |
| right image | |
| nx | 0.3780 |
| nz | 0.0024 |
| phi (deg) | 22.211 |
| theta (deg) | 89.861 |
| scale (px/um) | 0.07803 |
| pitch (deg) | −1.115 |
| roll (deg) | −0.041 |
| rms error (px) | 0.99 |

Figures 6I, 6J:
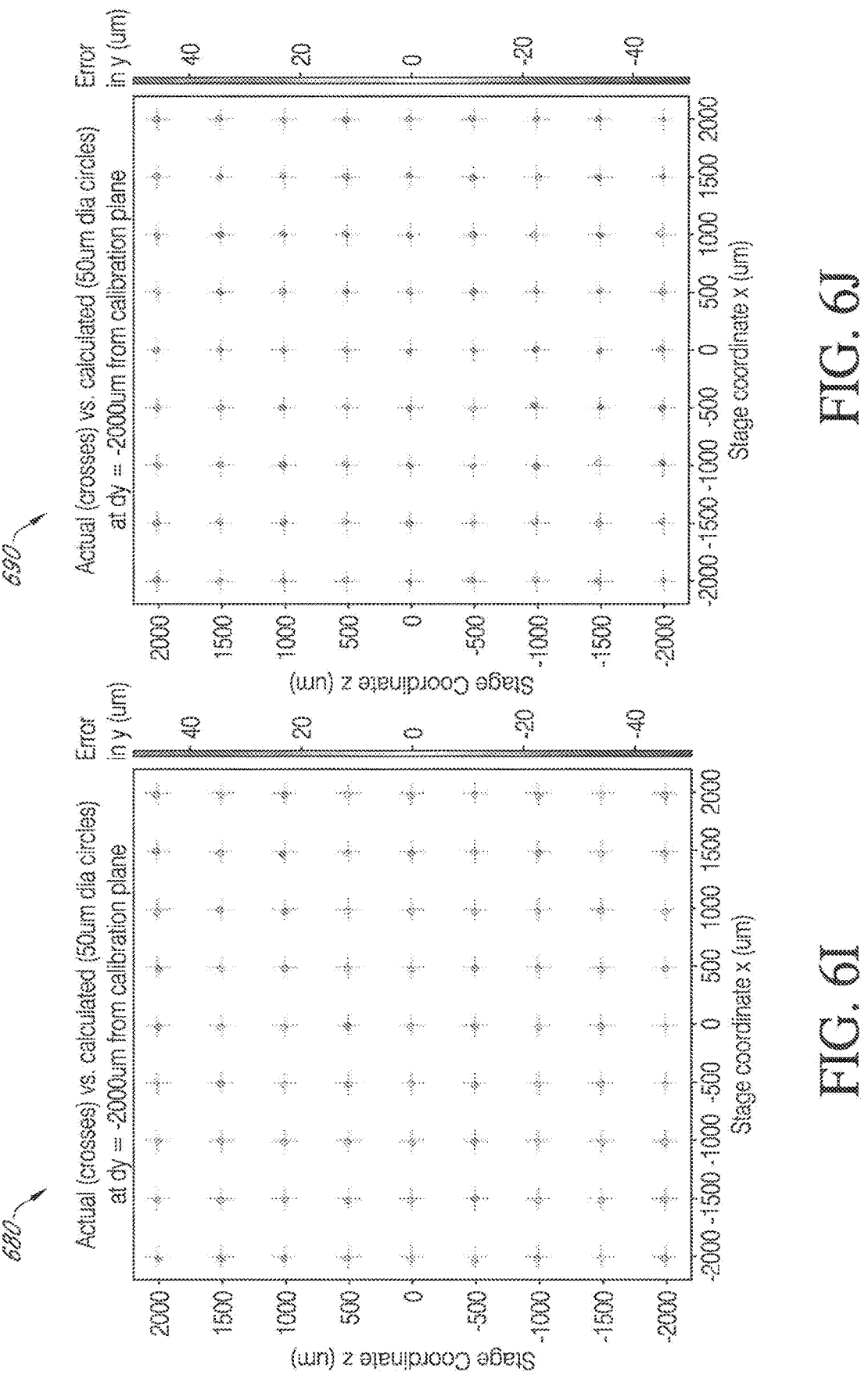

FIGS. 6I and 6J illustrate row and column locations in the stereo-image with image portions 680 and 690. As illustrated in image portions 680 and 690, the object displacement calculation results are illustrated for maximum displacements along $Y_g$ axis: -2 mm and 2 mm. The errors in determination of object coordinates (in µm) from stereo images are as follows:

| | |
|---|---|
| y rms error | 10.6 |
| y abs error, 99th perc. | 28.0 |
| x rms error | 10.3 |
| x abs error, 99th perc. | 26.6 |
| z rms error | 6.6 |
| z abs error, 99th perc. | 15.4 |
| total evaluation images | 729 |

Calibration and accuracy estimates are based on a 9×9×9 grid (±2 mm displacement from reference location along $X_g$, $Y_g$, and $Z_g$).

Observation angles: 22.4° deg (left), 22.2° (right). Magnification: 0.0773 px/µm (left) and 0.0780 px/µm (right). The dimensionless magnification is thus 0.078 px/µm×2.4 µm=0.186 (cf. Edmund datasheet: 0.181 at WD=150 mm).

Figure 7:
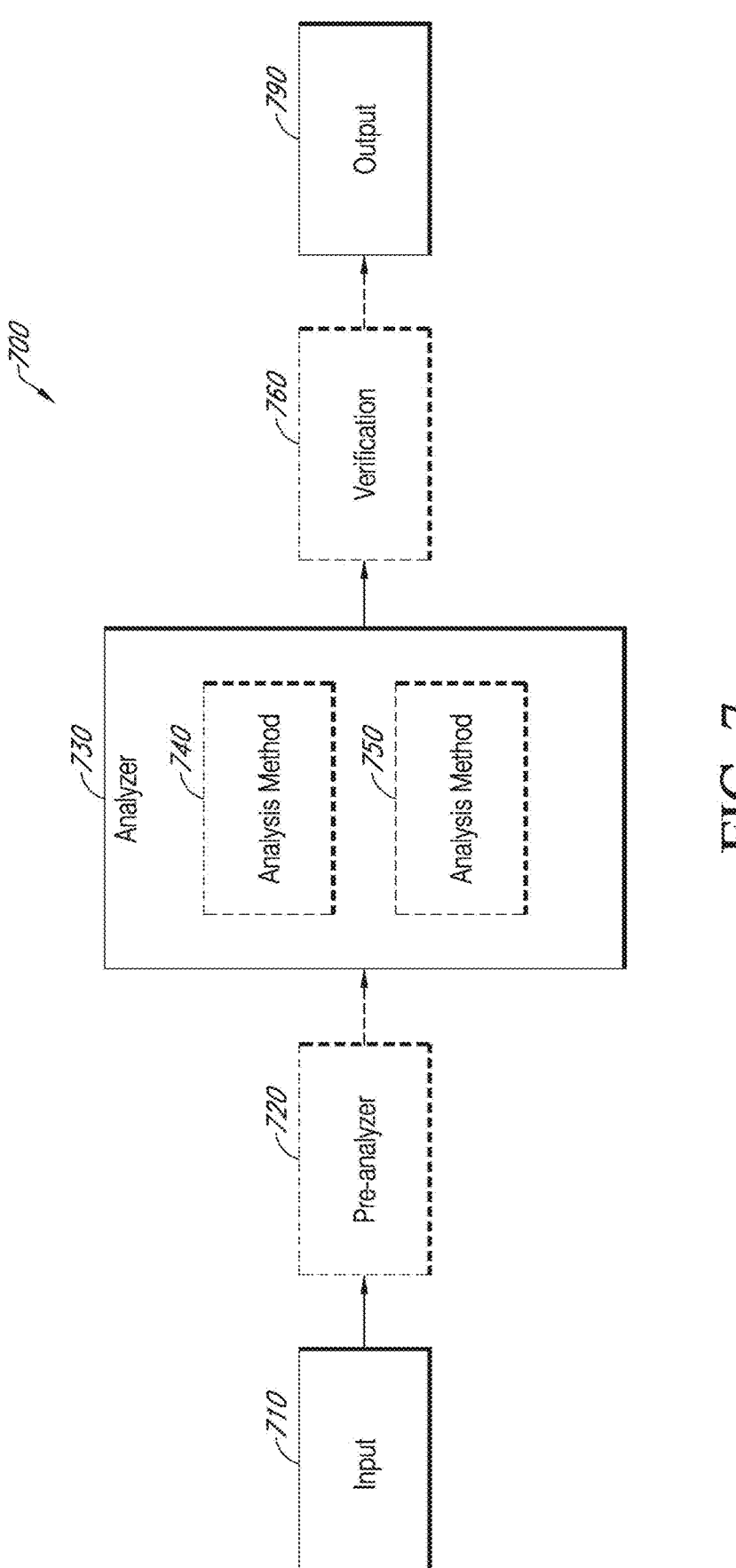
FIG. 7 illustrates an example image analysis workflow, in accordance with various embodiments.

FIG. 7 illustrates an example image analysis workflow 700, in accordance with various embodiments. As illustrated in FIG. 7, the workflow 700 begins with receiving input 710, which may be optionally processed via pre-analyzer 720 before being processed via analyzer 730. In various embodiments, the analyzer 730 may include analysis method 740 and/or analysis method 750. Once the input 710 has been analyzed, it may be processed via verification 760 before being output as output 790.

In various embodiments, input 710 may be a stereo-image that has been captured using an optical assembly. Two such non-limiting examples of such an optical assembly may include optical assembly 200 and/or optical assembly 300 as described, respectively, with respect to FIGS. 2 and 3. In various embodiments, pre-analyzer 720 may include an image analysis process to determine image quality metrics, such as contrast, brightness, etc. of the stereo-image being processed via input 710. In some embodiments, predetermined analyzer configuration may be input to perform the image analysis of pre-analyzer 720. Once the image quality is acceptable, the stereo-image of input 710 may be processed via analyzer 730.

In various embodiments, analyzer 730 may be configured to find features of interest (e.g., tip corners). In various embodiments, analysis method 740 may include a template matching process to determine tip corners or tip center in each of a first image portion and a second image portion of the stereo-image. In various embodiments, the template matching may be performed via a pre-annotated template. In various embodiments, the pre-annotated template can include at least two corners of the template pre-annotated for determining a center position of the tip in each of the first image portion and the second image portion of the stereo-image that is being matched with the pre-annotated template. In various embodiments, analysis method 740 may include using a fast Fourier transform (FFT) template method to match an area of interest (AOI) in each of the first image portion and the second image portion with a mask template of the object, and then determining a center position for each of the first image portion and the second image portion upon matching the AOIs of the first image portion and the second image portion, and then calculating the displacement value by determining a difference between the center position and the reference position of the object, such as object 505, in each of the first image portion and the second image portion. In various embodiments, analysis method 750 may include using a corner or edge detection method. In various embodiments, analysis method 750 may include Shi-Tomasi corner detection method to calculate corner function values.

In various embodiments, optional verification 760 may be performed to validate correlation, corner function values, or distances determined via analysis method(s) 740 and/or analysis method 750. Once the 3D coordinates or position values of the pipette tip position in the stereo-image are acceptable, the image analysis workflow 700 proceeds to output 790. Further details of the image analysis are described in example methods illustrated in flowcharts of FIGS. 11 and 12.

Figure 8A:
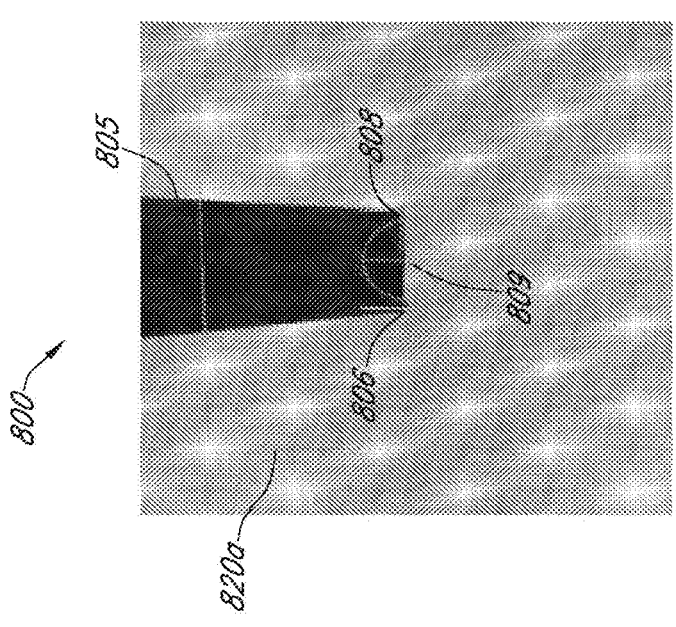
FIG. 8A shows an example illustration of a stereo-image analysis, in accordance with various embodiments.

FIG. 8A shows an example analysis of an image portion 800, in accordance with various embodiments. As illustrated in FIG. 8A, image portion 800 is shown with an object (e.g., pipette tip) 805 overlayed within a template 820a with corners 806, 808, and center 809 of the pipette tip 805 identified. This illustration, for example, depicts analysis performed, for example, via analysis method 740 in the image analysis workflow 700, where analysis method 740 and image analysis workflow 700 described in FIG. 7 are non-limiting examples of such an analysis method and image analysis workflow respectively.

Figure 8B:
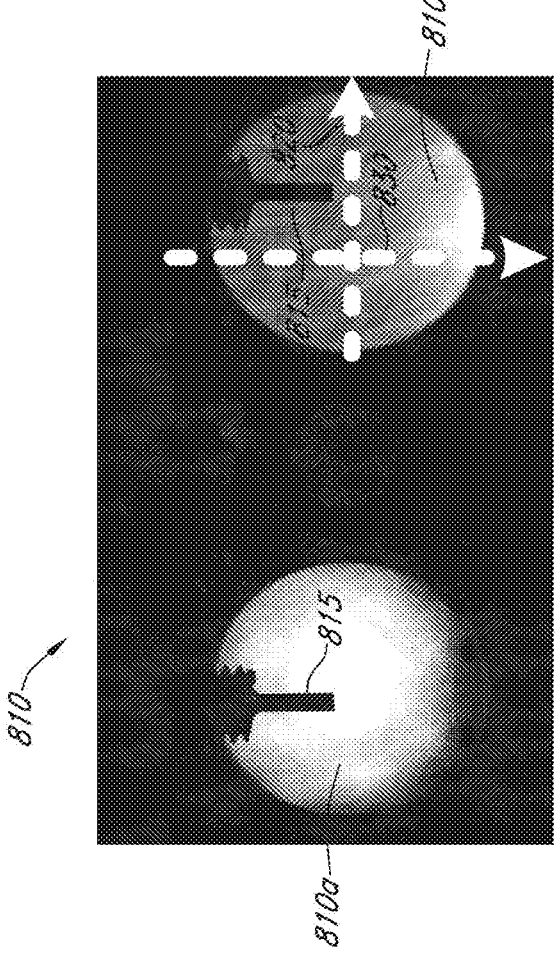
FIG. 8B shows an example analysis of an image portion, in accordance with various embodiments.

FIG. 8B shows an example stereo-image 810 of an object 815, in accordance with various embodiments. As illustrated in FIG. 8B, a first image portion 810a and a second image portion 810b of the stereo-image 810 do not have uniform contrast, brightness, etc. In other words, the stereo-image 810 does not have a good enough quality image to perform image analysis.

Figure 8C:
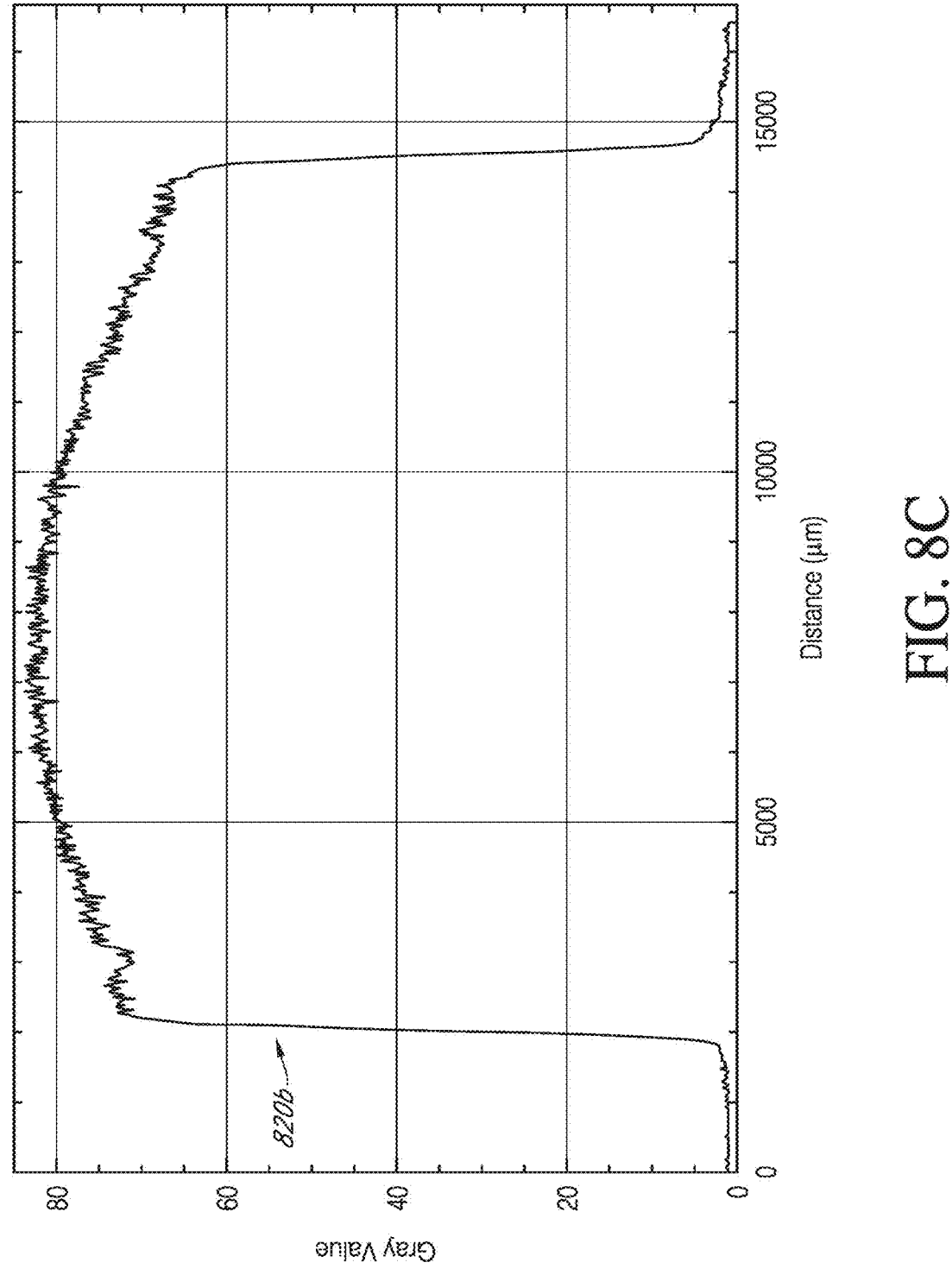
FIG. 8C depicts a brightness profile along a line of the stereo-image shown in FIG. 8B.
Figure 8D:
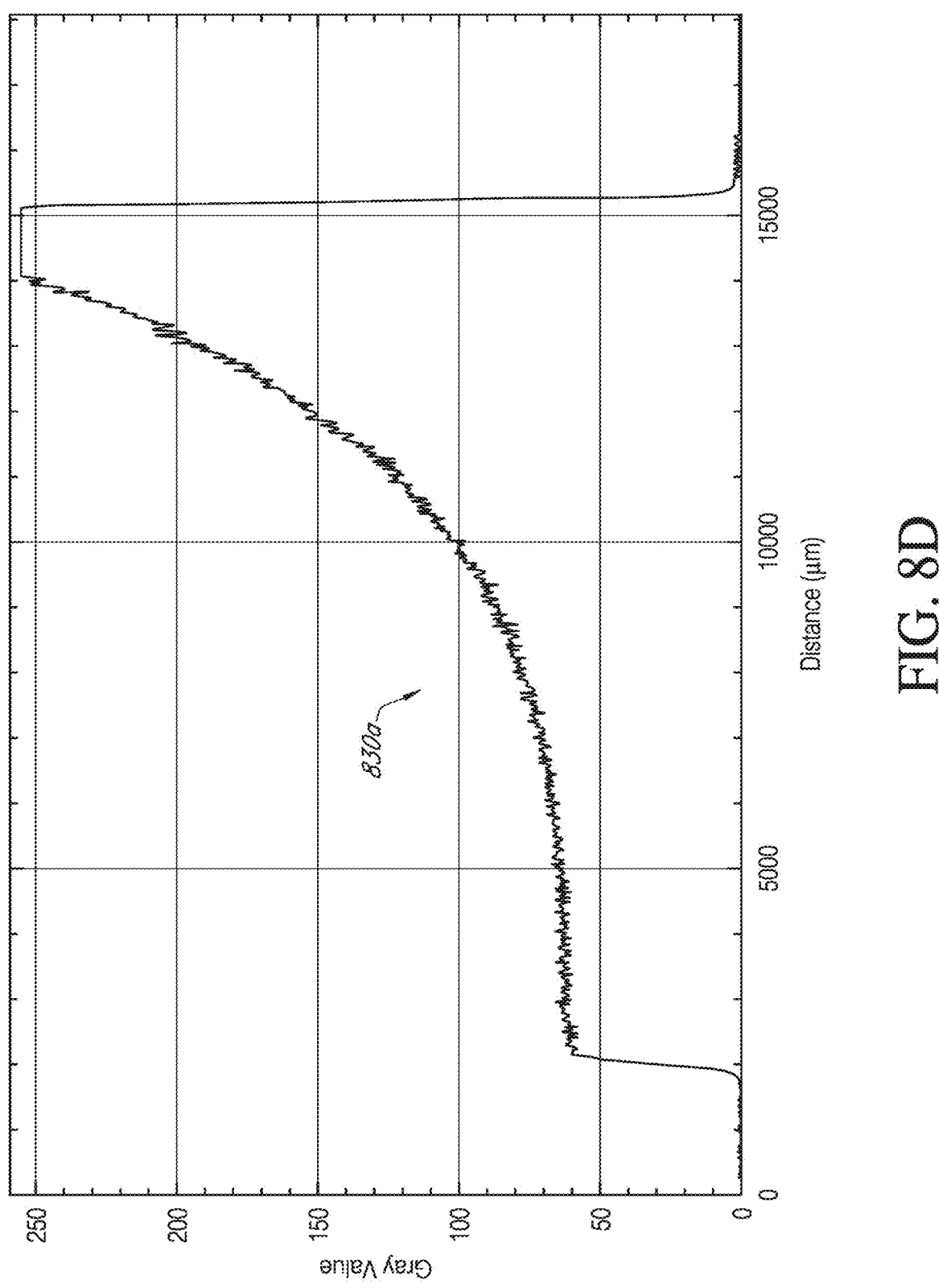
FIG. 8D depicts another brightness profile along another line of the stereo-image shown in FIG. 8B.

To assess image quality of the stereo-image 810, brightness values are plot as a function of distance to obtain brightness profiles in the second image portion 810b, identified by lines 820 and 830. FIG. 8C depicts a brightness profile 820b along line 820 of the stereo-image 810 shown in FIG. 8B. FIG. 8D depicts another brightness profile 830b along line 830 of the stereo-image 810 shown in FIG. 8B. As shown in FIGS. 8C and 8D, brightness is more uniform across line 820 than line 830. In other words, if image quality is poor, image analysis cannot be performed. Thus, optical assemblies, of which two non-limiting examples include but are not limited to optical assembly 200 and/or optical assembly 300 from FIGS. 2 and 3, respectively, are configured to capture satisfactory quality of stereo-images.

Figure 9A:
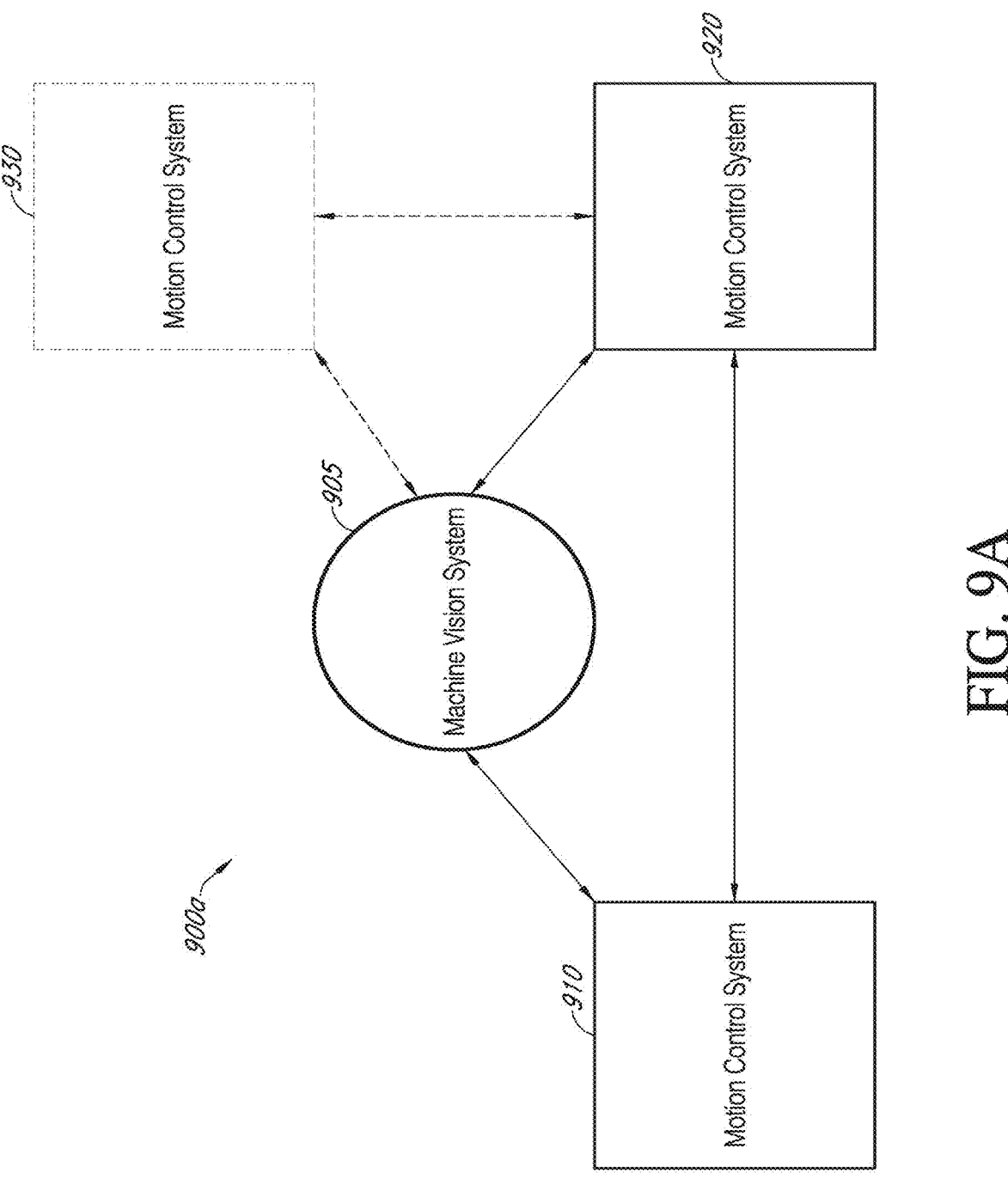
FIG. 9A depicts a schematic illustration of a machine vision system for calibrating and co-registering one or more motion control systems, in accordance with various embodiments.

FIG. 9A depicts a schematic illustration 900a of a machine vision system 905 for calibrating and co-registering one or more motion control systems 910, 920, 930 in accordance with various embodiments. In accordance with various embodiments, the machine vision system 905 may include an optical assembly, of which two non-limiting examples of such optical assemblies include but are not limited to optical assembly 200 and/or optical assembly 300 from FIGS. 2, and 3 respectively. In various embodiments, the optical assembly of the machine vision system 905 may be configured to capture one or more stereo-images of an object. Two such non-limiting examples of such object may include but are not limited to object 205 and/or object 305 as described, respectively, with respect to FIGS. 2 and 3.

In various embodiments, machine vision system 905 can be used to calibrate motion control system 910, which is configured to manipulate a (2D or 3D) position, a movement, and/or a trajectory of an object, which can be a tip, a pipette tip, such as pipette tip 805, that is mounted on an actuation mechanism, such as a linear motor, a linear stage, etc. In various embodiments, the motion control system 910 may be calibrated such that every new pipette tip is positioned accurately at the desired location in 3D space. In such instances, the machine vision system 905 may be used to "mark" the desired location in 3D space in its coordinate system such that the position of the new pipette tip may be corrected so that it is positioned at the desired location. In various embodiments, the desired location may be a specific location for dispensing a fluid with the pipette tip.

In various embodiments, machine vision system 905 can be used to calibrate motion control system 920, which may be configured to move a stage along two orthogonal axes. In some cases, the stage may be configured to hold a sample, such as sample 110 (e.g., a biological specimen). In various embodiments, the stage can be mounted on a first linear stage that moves along a first axis and the first linear stage is mounted on a second linear stage that is configured to move along a second axis. In such cases, the machine vision system 905 may be used to ensure the stage is positioned precisely at the desired location by calibrating the two linear stages. In such instances, the machine vision system 905 may be used in positioning the stage accurately at the desired location in 3D space.

In various embodiments, machine vision system 905 may be configured to co-register motion control system 910 and motion control system 920 such that the pipette of motion control system 910 can be co-located with a specific location of the stage such that the pipette can deliver or dispense a fluid to a specific portion of the sample of the stage.

Figure 9B:
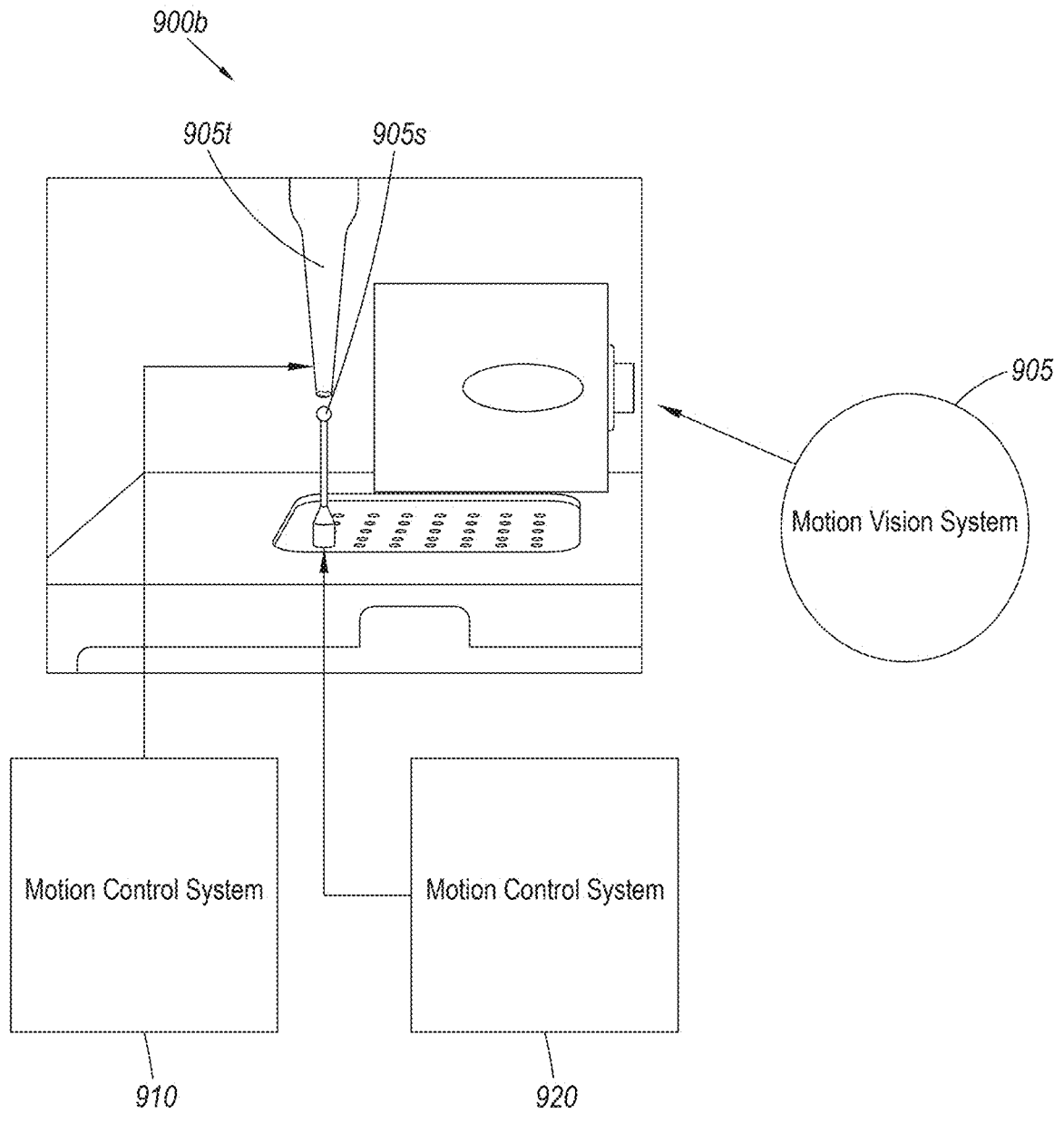
FIG. 9B depicts a schematic illustration of the machine vision system for calibrating and co-registering two motion control systems, in accordance with various embodiments.

FIG. 9B depicts a schematic illustration 900b of the machine vision system 905 for calibrating and co-registering two motion control systems 910, 920 in accordance with various embodiments. As depicted in the illustration 900b, the pipette 905t of motion control system 910 and the probe tip of stage 905s of motion control system 920 are co-located and co-registered via the machine vision system 905, in accordance with various embodiments. From the co-registration, relative positions, movements, and/or trajectories of the pipette 905t with respect to the stage can be determined via the machine vision system 905, in accordance with various embodiments.

Figure 10A:
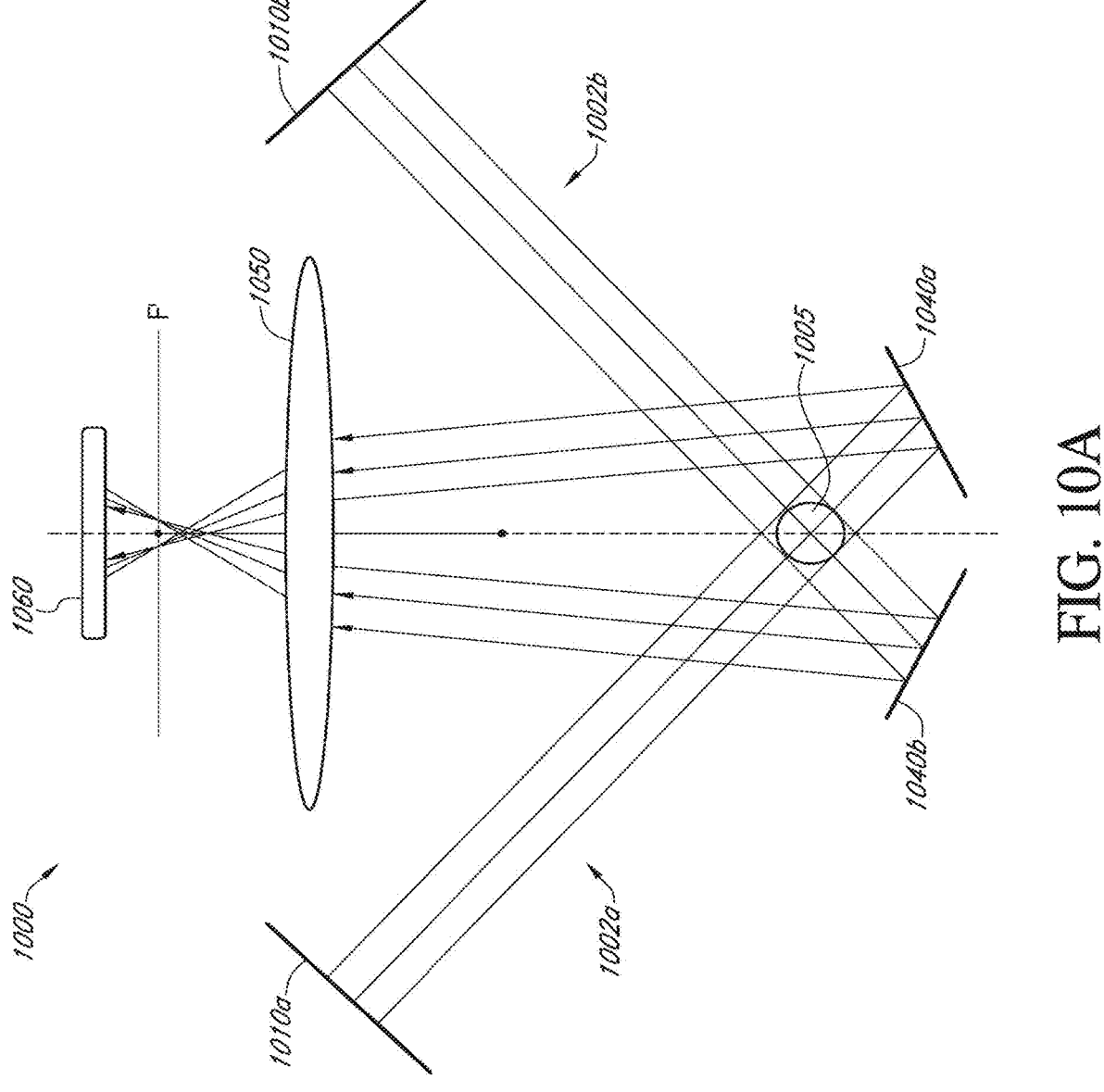
FIG. 10A illustrates a schematic of an optical assembly for machine vision calibration, in accordance with various embodiments.

FIG. 10A illustrates a schematic of an optical assembly 1000 for machine vision calibration. Similar to the optical assembly in FIG. 2 above, FIG. 10A includes light sources 1010a, 1010b, imaging mirrors 1040a, 1040b, a focusing lens 1050, and a sensor array 1060 for imaging the object 1005. As illustrated in FIG. 10A, a first light beam 1002a is emitted from the first light source 1010a towards the object 1005 and the first imaging mirror 1040a, thereby illuminating the object 1005. The first imaging mirror 1040a then reflects the first light beam 1002a (with a shadow/silhouette of the object 1005) towards the focusing lens 1050, which then collects and focuses the light onto the sensor array 1060 to form a portion of a stereo-image. Similarly, a second light beam 1002b is emitted from the second light source 1010b towards the object 1005 and the second imaging mirror 1040b, thereby illuminating the object 1005. The second imaging mirror 1040b then reflects the second light beam 1002b (with another shadow/silhouette of the object 1005 from a different angle than the first shadow/silhouette) towards the focusing lens 1050, which then collects and focuses the light onto the sensor array 1060 to form a second portion of the stereo-image. In various embodiments, the object 1005 is at or near an intersection point of the first light beam 1002a and the second light beam 1002b. In various embodiments, the stereo-image can be generated via the sensor array 1060 based on the light captured via the first light beam 1002a and the second light beam 1002b. In various embodiments, the first light beam 1002a and the second light beam 1002b intersect one another at an intersection angle within an intersection region 1006. In various embodiments, the first light beam 1002a and the second light beam 1002b are orthogonal or substantially orthogonal to one another. In various embodiments, the intersection angle is about 45 degrees to about 135 degrees. In various embodiments, the intersection angle is about 90 degrees.

In various embodiments, the first light source 1010a and/or the second light source 1010b includes a broad band light source. In various embodiments, the first light source 1010a and/or the second light source 1010b each have a spectral profile that includes a range of wavelengths corresponding to a specific color of light (e.g., red, yellow, green, blue, etc.).

Figure 10B:
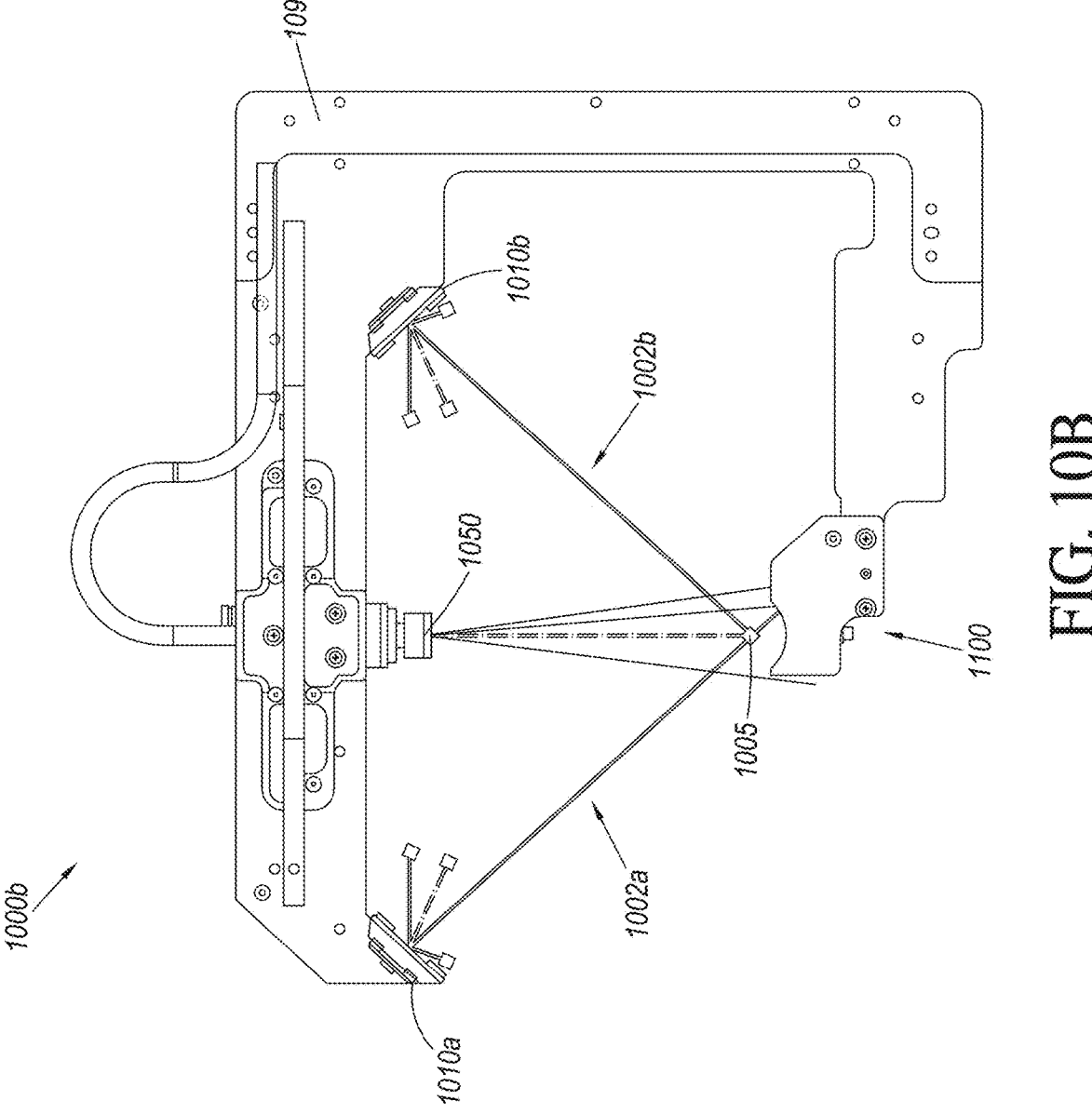
FIG. 10B illustrates a top view of an optical assembly for machine vision calibration, in accordance with various embodiments.
Figure 10C:
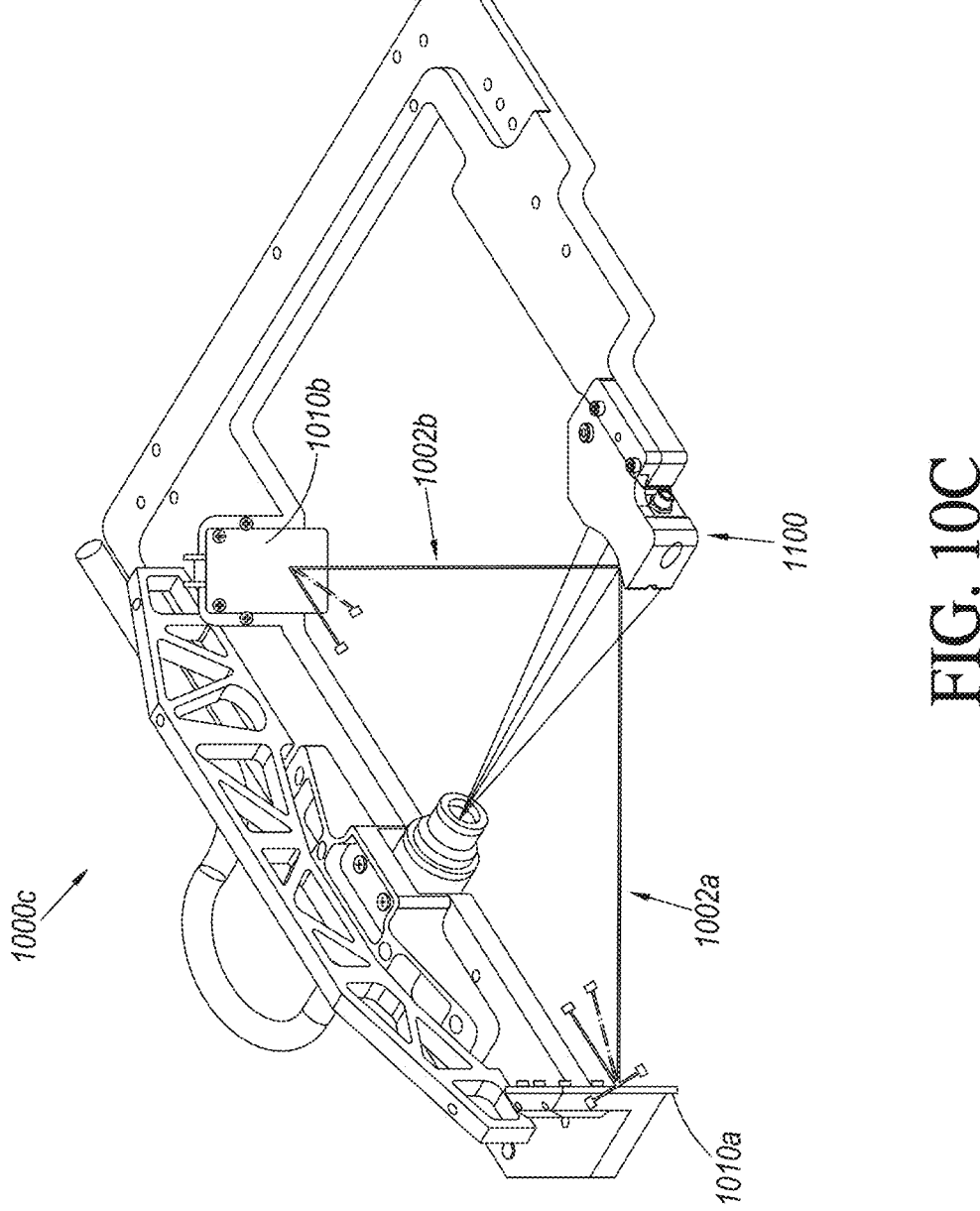
FIG. 10C illustrates a perspective view of an optical assembly for machine vision calibration, in accordance with various embodiments.

FIG. 10B illustrates a top view of an optical assembly 1000 for machine vision calibration and FIG. 10C illustrates a perspective view of the optical assembly 1000. In particular, FIGS. 10B and 10C illustrate an implementation of the optical assembly 1000 with a frame 1090 (e.g., U-shaped frame) supporting the light sources 1010a, 1010b, the imaging mirrors 1040a, 1040b, the focusing lens 1050, and the sensor array 1060. In various embodiments, the frame 1090 may include two or more frames coupled together. In various embodiments, the imaging mirrors 1040a, 1040b are positioned on a mirror block 1100 that is coupled to the frame 1090.

Figure 11:
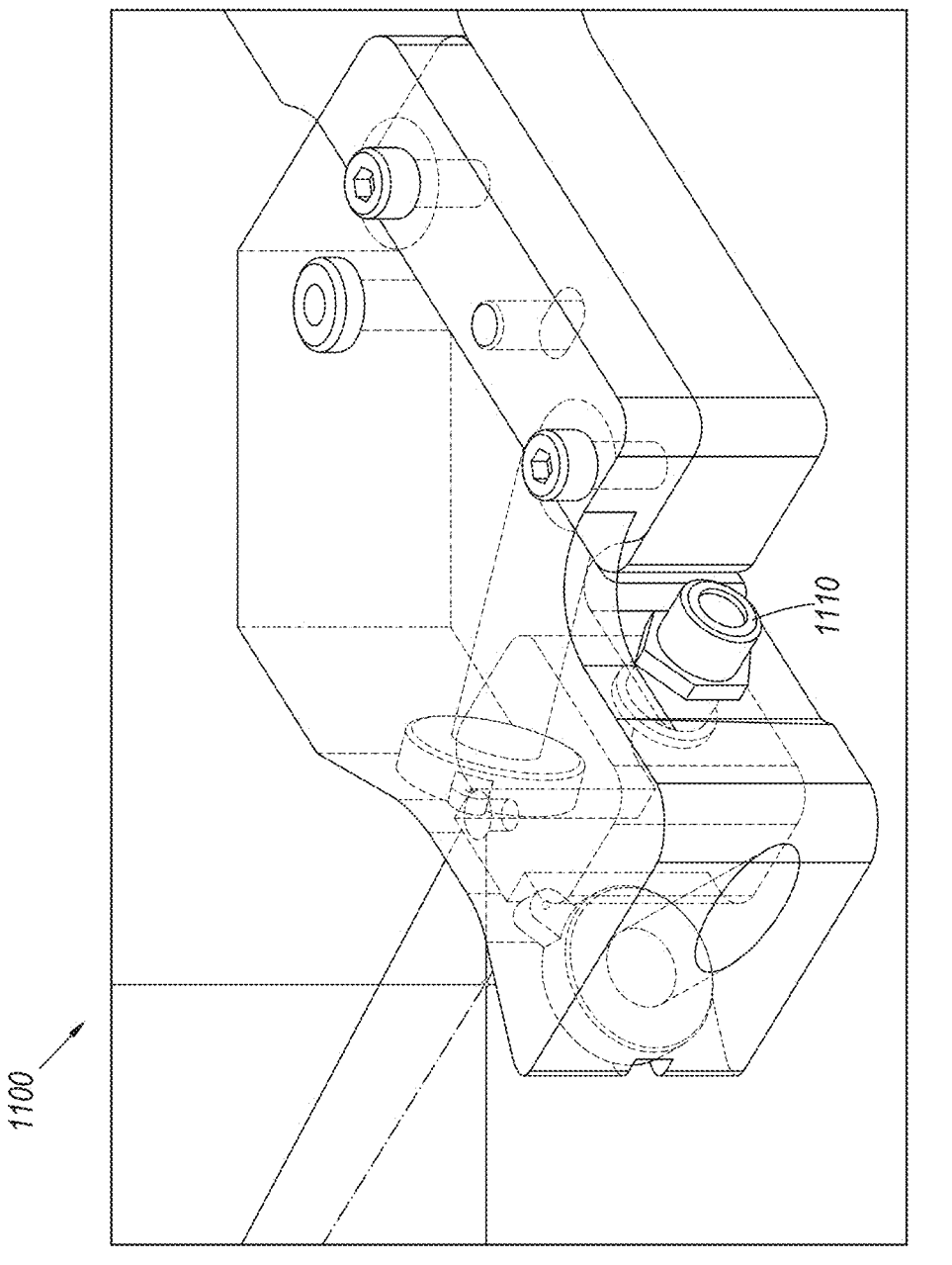
FIG. 11 illustrates a mirror block of an optical assembly for machine vision calibration, in accordance with various embodiments.

FIG. 11 illustrates a mirror block 1100 of an optical assembly (such as but not limited to optical assembly 1000) for machine vision calibration. In various embodiments, the mirror block 1100 include a first and a second imaging mirror. Non-limiting examples of the first and second imaging mirrors may include but are not limited to the first imaging mirror 1040a and the second imaging mirror 1040b from FIG. 10A, respectively. In various embodiments, the mirror block 1100 includes a fiber connector 1110. In various embodiments, the fiber connector 1110 is configured for focus adjustment. In various embodiments, the fiber connector 1110 comprises a SMA port. In various embodiments, a fiber optic connector is attached to a light source and the fiber is connected into the SMA port. In various embodiments, light is transmitted through the fiber from the light source to the mirror block 1100 to generate a light point at the end of the fiber used to set the focus of the optical assembly.

Figure 12:
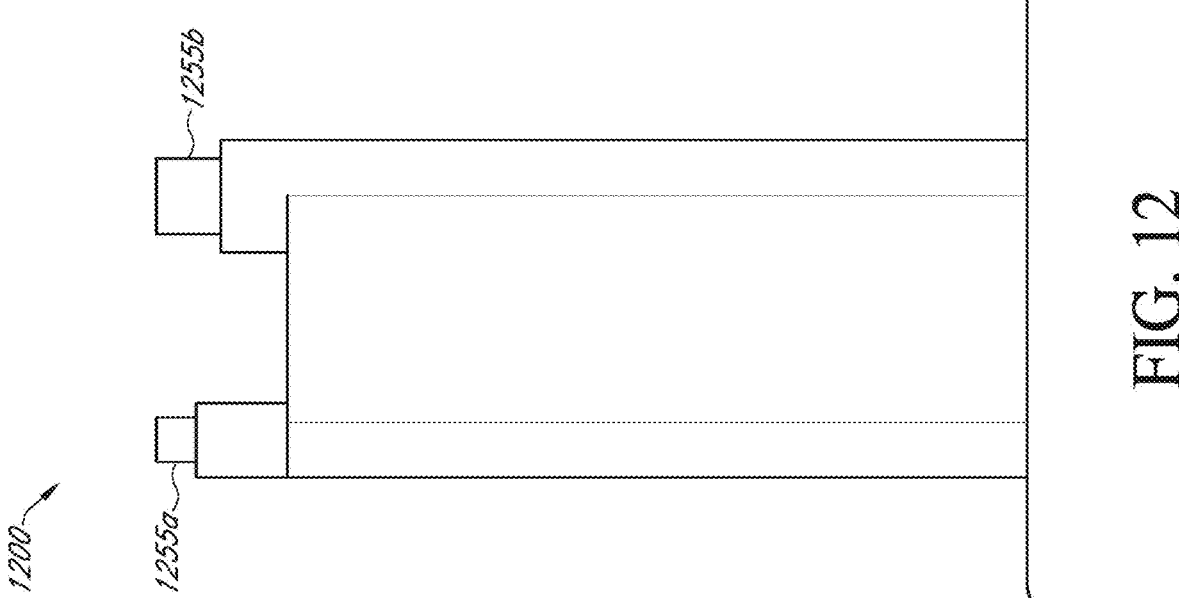
FIG. 12 illustrates an example calibration post, in accordance with various embodiments.

FIG. 12 illustrates an example of a calibration post 1200. In various embodiments, the calibration post 1200 includes two or more distinct calibration objects, such as a first calibration object 1255a and a second calibration object 1255b. In various embodiments, the first calibration object 1255a has a first set of geometric features (e.g., shape, size, height, width, etc.) and the second calibration object 1255b has a second set of geometric features (e.g., shape, size, height, width, etc.) that is different from the first set of geometric features.

Figure 13:
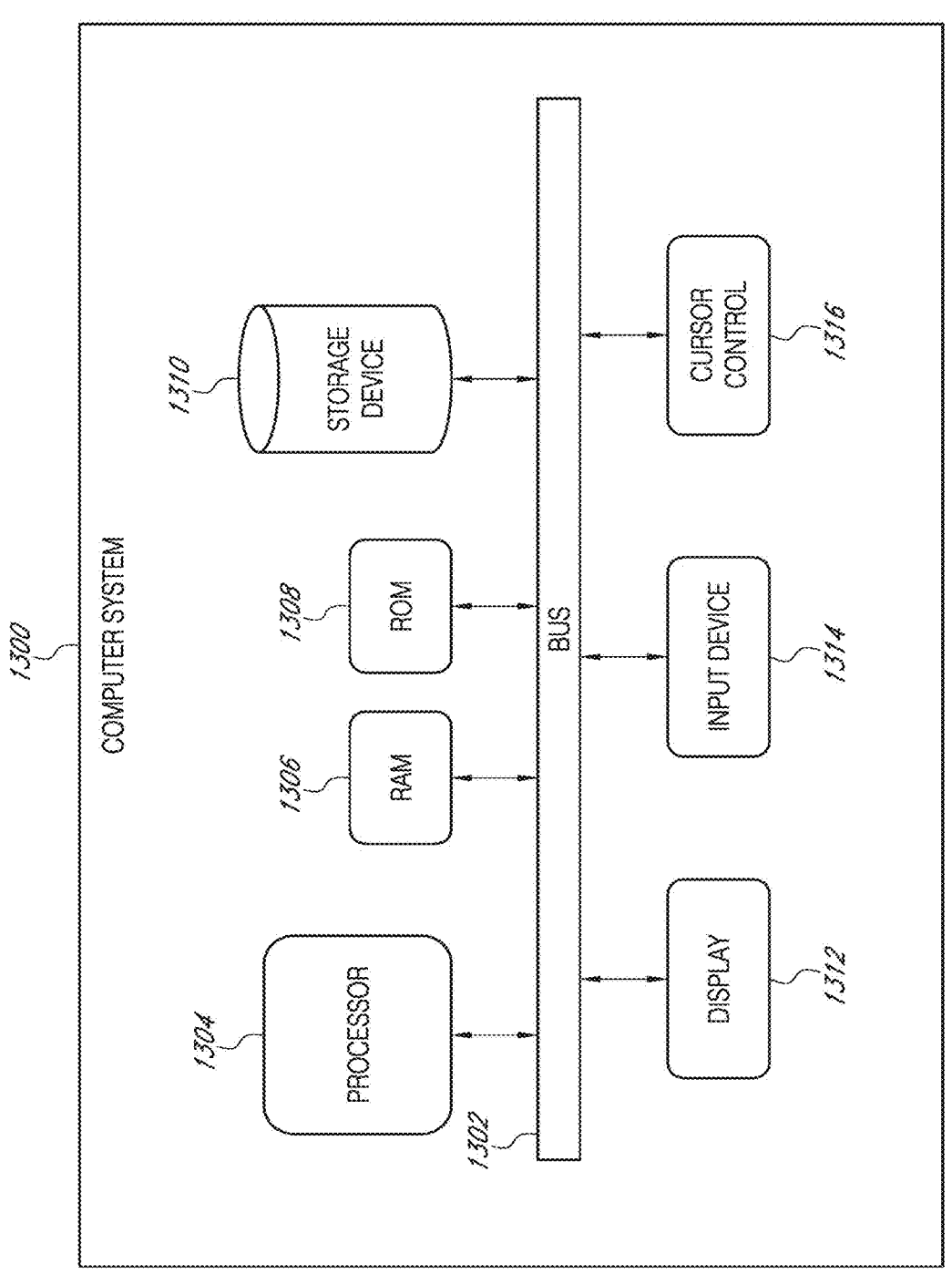
FIG. 13 is a block diagram of a computer system, in accordance with various embodiments.

FIG. 13 is a block diagram of a computer system 1300, in accordance with various embodiments. Computer system 1300 may be configured to implement image analysis as described with various embodiments described herein.

In one or more examples, computer system 1300 can include a bus 1302 or other communication mechanism for communicating information, and a processor 1304 coupled with bus 1302 for processing information. In various embodiments, computer system 1300 can also include a memory, which can be a random-access memory (RAM) 1306 or other dynamic storage device, coupled to bus 1302 for determining instructions to be executed by processor 1304. Memory also can be used for storing temporary variables or other intermediate information during execution of instructions to be executed by processor 1304. In various embodiments, computer system 1300 can further include a read only memory (ROM) 1308 or other static storage device coupled to bus 1302 for storing static information and instructions for processor 1304. A storage device 1310, such as a magnetic disk or optical disk, can be provided and coupled to bus 1302 for storing information and instructions.

In various embodiments, computer system 1300 can be coupled via bus 1302 to a display 1312, such as a cathode ray tube (CRT), liquid crystal display (LCD), or light emitting diode (LED) for displaying information to a computer user. An input device 1314, including alphanumeric and other keys, can be coupled to bus 1302 for communicating information and command selections to processor 1304. Another type of user input device 1314 is a cursor control 1316, such as a mouse, a joystick, a trackball, a gesture input device, a gaze-based input device, or cursor direction keys for communicating direction information and command selections to processor 1304 and for controlling cursor movement on display 1312. This input device 1314 typically has two degrees of freedom in two axes, a first axis (e.g., x) and a second axis (e.g., y), that allows the device to specify positions in a plane. However, it should be understood that input devices 1314 allowing for three-dimensional (e.g., x, y, and z) cursor movement are also contemplated herein.

Consistent with certain implementations of the present teachings, results can be provided by computer system 1300 in response to processor 1304 executing one or more sequences of one or more instructions contained in RAM 1306. Such instructions can be read into RAM 1306 from another computer-readable medium or computer-readable storage medium, such as storage device 1310. Execution of the sequences of instructions contained in RAM 1306 can cause processor 1304 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, storage device, data storage device, etc.) or "computer-readable storage medium" as used herein refers to any media that participates in providing instructions to processor 1304 for execution. Such a medium can take many forms, including but not limited to, non-volatile media, volatile media, and transmission media. Examples of non-volatile media can include, but are not limited to, optical, solid state, magnetic disks, such as storage device 1310. Examples of volatile media can include, but are not limited to, dynamic memory, such as RAM 1306. Examples of transmission media can include, but are not limited to, coaxial cables, copper wire, and fiber optics, including the wires that comprise bus 1302.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 1304 of computer system 1300 for execution. For example, a communication apparatus may include a transceiver having signals indicative of instructions and data. The instructions and data are configured to cause one or more processors 1304 to implement the functions outlined in the disclosure herein. Representative examples of data communications transmission connections can include, but are not limited to, telephone modem connections, wide area networks (WAN), local area networks (LAN), infrared data connections, NFC connections, optical communications connections, etc.

It should be appreciated that the methodologies described herein, flow charts, diagrams, and accompanying disclosure can be implemented using computer system 1300 as a standalone device or on a distributed network of shared computer processing resources such as a cloud computing network.

The methodologies described herein may be implemented by various means depending upon the application. For example, these methodologies may be implemented in hardware, firmware, software, or any combination thereof. For a hardware implementation, the processor 1304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 1300, whereby processor 1304 would execute the analyses and determinations provided by these engines, subject to instructions provided by any one of, or a combination of, the memory components RAM 1306, ROM, 1308, or storage device 1310 and user input provided via input device 1314.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

ADDITIONAL RECITED EMBODIMENTS

Embodiment 1: An optical assembly comprising: one or more light sources configured to generate a first light beam and a second light beam that intersects the first light beam at an intersection region to thereby illuminate an object within the intersection region; a sensor array configured to receive the first light beam and the second light beam to thereby form a stereo-image based on received light from the first light beam and the second light beam; a first imaging mirror configured to reflect the first light beam after the intersection region and towards the sensor array; and a second imaging mirror configured to reflect the second light beam after the intersection region and towards the sensor array.

Embodiment 2: The optical assembly of embodiment 1, wherein the first imaging mirror and the second imaging mirror are positioned behind the object opposite the one or more light sources and/or the sensor array.

Embodiment 3: The optical assembly of embodiments 1 or 2, wherein the first imaging mirror and the second imaging mirror are oriented such that a surface normal to a mirror surface of the first imaging mirror is oriented at an angle between 90° and 180° from a surface normal to a mirror surface of the second imaging mirror.

Embodiment 4: The optical assembly of any one of embodiments 1-3, wherein the first imaging mirror and the second imaging mirror are mounted on a single optical mount.

Embodiment 5: The optical assembly of any one of embodiments 1-4, further comprising: a focusing lens configured to collect and focus reflected light from the first imaging mirror to a first portion of the sensor array and from the second imaging mirror to a second portion of the sensor array.

Embodiment 6: The optical assembly of embodiment 5, wherein a depth of field of the focusing lens is larger than an expected shift of the object.

Embodiment 7: The optical assembly of embodiment 6, wherein the depth of field of the focusing lens is at least twice as large as the expected shift of the object.

Embodiment 8: The optical assembly of any one of embodiments 5-7, wherein a focal length of the focusing lens is larger than a physical distance between the object and the focusing lens such that a surface of the object facing the sensor array is not captured in the stereo-image.

Embodiment 9: The optical assembly of any one of embodiments 5-7, wherein a focal length of the focusing lens is larger than the physical distance between the object and the focusing lens such that a surface of the object facing away from the sensor array is captured in the stereo-image via a reflection from the first imaging mirror or the second imaging mirror.

Embodiment 10: The optical assembly of embodiments 8 or 9, wherein the focal length of the focusing lens is substantially equal to a combined distance of two distance values, wherein a first distance value is measured between the sensor array and the first imaging mirror (or the second imaging mirror), and a second distance value is measured between the first imaging mirror (or the second imaging mirror) and the object.

Embodiment 11: The optical assembly of any one of embodiments 6-10, wherein a focal length of the focusing lens is about 20 cm to about 30 cm.

Embodiment 12: The optical assembly of any one of embodiments 1-11, further comprising: a first folding mirror configured to redirect the first light beam from the one or more light sources onto the object and the first imaging mirror; and a second folding mirror configured to redirect the second light beam from the one or more light sources onto the object and the second imaging mirror.

Embodiment 13: The optical assembly of any one of embodiments 1-12, further comprising: a first collimating lens configured to collimate the first light beam from the one or more light sources onto the object and the first imaging mirror; and a second collimating lens configured to collimate the second light beam from the one or more light sources onto the object and the second imaging mirror.

Embodiment 14: The optical assembly of any one of embodiments 1-13, wherein the one or more light sources comprises a single light source configured for illuminating the object via the first light beam and the second light beam.

Embodiment 15: The optical assembly of any one of embodiments 1-13, wherein the one or more light sources comprises a first light source and a second light source, the first light source configured for illuminating the object via the first light beam and the second light source for illuminating the object via the second light beam.

Embodiment 16: The optical assembly of any one of embodiments 6-15, wherein an image parameter of the stereo-image formed at the first portion of the sensor array is identical or substantially identical to an image parameter of the stereo-image formed at the second portion of the sensor array such that a contrast value and/or a brightness value of the stereo-image are within a predetermined threshold.

Embodiment 17: The optical assembly of any one of embodiments 1-16, wherein the one or more light sources comprises one or more light emitting diodes (LEDs).

Embodiment 18: The optical assembly of any one of embodiments 1-17, wherein the first light beam intersects the second light beam at an intersection angle.

Embodiment 19: The optical assembly of any one of embodiments 1-18, wherein the first light beam is orthogonal or substantially orthogonal to the second light beam.

Embodiment 20: The optical assembly of embodiment 18, wherein the intersection angle is about 70 degrees to about 110 degrees.

Embodiment 21: The optical assembly of embodiment 20, where the intersection angle is about 90 degrees.

Embodiment 22: The optical assembly of any one of embodiments 1-21, wherein a distance between the focusing lens and the first imaging mirror and/or the second imaging mirror is about 15 cm to about 50 cm.

Embodiment 23: The optical assembly of any one of embodiments 1-22, wherein the focusing lens and the sensor array are packaged as a camera.

Embodiment 24: A machine vision system comprising: the optical assembly of any one of embodiments 1-23; and a computing node for processing one or more stereo-images received from the sensor array, wherein the computing node is configured for determining a three-dimensional shape, a three-dimensional location, and/or a trajectory of the object based on the one or more stereo-images.

Embodiment 25: The machine vision system of embodiment 24, wherein the one or more stereo-images are analyzed via an algorithm to extract location information and/or movement information of the object in real-time.

What is claimed:
1. An optical assembly comprising:
one or more light sources configured to generate a first light beam and a second light beam that intersects the first light beam at an intersection region to thereby illuminate the intersection region;
an object configured to be positioned within the intersection region such that the object is illuminated by the one or more light sources;
a sensor array configured to receive the first light beam and the second light beam to thereby form a stereo- image based on received light from the first light beam and the second light beam;

a first imaging mirror configured to reflect the first light beam after the intersection region and towards the sensor array, wherein the first imaging mirror is positioned behind the object opposite the one or more light sources and/or the sensor array when the object is positioned within the intersection region; and a second imaging mirror configured to reflect the second light beam after the intersection region and towards the sensor array, wherein the second imaging mirror is positioned behind the object opposite the one or more light sources and/or the sensor array when the object is positioned within the intersection region.

2. The optical assembly of claim 1, wherein the first imaging mirror and the second imaging mirror are oriented such that a surface normal to a mirror surface of the first imaging mirror is oriented at an angle between 90° and 180° from a surface normal to a mirror surface of the second imaging mirror.

3. The optical assembly of claim 1, further comprising:

a focusing lens configured to collect and focus reflected light from the first imaging mirror to a first portion of the sensor array and from the second imaging mirror to a second portion of the sensor array.

4. The optical assembly of claim 3, wherein a depth of field of the focusing lens is larger than an expected shift of the object.

5. The optical assembly of claim 4, wherein the depth of field of the focusing lens is at least twice as large as the expected shift of the object.

6. The optical assembly of claim 3, wherein a focal length of the focusing lens is larger than a physical distance between the object and the focusing lens such that a surface of the object facing the sensor array is not captured in the stereo-image while a surface of the object facing away from the sensor array is captured in the stereo-image via a reflection from the first imaging mirror or the second imaging mirror.

7. The optical assembly of claim 6, wherein the focal length of the focusing lens is substantially equal to a combined distance of two distance values, wherein a first distance value is measured between the sensor array and the first imaging mirror (or the second imaging mirror), and a second distance value is measured between the first imaging mirror (or the second imaging mirror) and the object.

8. The optical assembly of claim 1, further comprising:

a first folding mirror configured to redirect the first light beam from the one or more light sources onto the object and the first imaging mirror; and a second folding mirror configured to redirect the second light beam from the one or more light sources onto the object and the second imaging mirror.

9. The optical assembly of claim 1, further comprising:

a first collimating lens configured to collimate the first light beam from the one or more light sources onto the object and the first imaging mirror; and a second collimating lens configured to collimate the second light beam from the one or more light sources onto the object and the second imaging mirror.

10. The optical assembly of claim 6, wherein an image parameter of the stereo-image formed at the first portion of the sensor array is identical or substantially identical to an image parameter of the stereo-image formed at the second portion of the sensor array such that a contrast value and/or a brightness value of the stereo-image are within a predetermined threshold.

11. The optical assembly of claim 1, wherein the one or more light sources comprises one or more light emitting diodes (LEDs).

12. The optical assembly of claim 1, wherein the first light beam intersects the second light beam at an intersection angle.

13. The optical assembly of claim 1, wherein the first light beam is orthogonal or substantially orthogonal to the second light beam.

14. The optical assembly of claim 12, wherein the intersection angle is about 70 degrees to about 110 degrees.

15. The optical assembly of claim 3, wherein a distance between the focusing lens and the first imaging mirror and/or the second imaging mirror is about 15 cm to about 50 cm.

16. The optical assembly of claim 3, wherein the focusing lens and the sensor array are packaged as a camera.

17. A machine vision system comprising:

the optical assembly of claim 1; and a computing node for processing one or more stereo-images received from the sensor array, wherein the computing node is configured for determining a three-dimensional shape, a three-dimensional location, and/or a trajectory of the object based on the one or more stereo-images.

18. The machine vision system of claim 17, wherein the one or more stereo-images are analyzed via an algorithm to extract location information and/or movement information of the object in real-time.

19. An optical assembly comprising:

one or more light sources configured to generate a first light beam and a second light beam that intersects the first light beam at an intersection region to thereby illuminate an object within the intersection region;

a sensor array configured to receive the first light beam and the second light beam to thereby form a stereo-image based on received light from the first light beam and the second light beam;

a first imaging mirror configured to reflect the first light beam after the intersection region and towards the sensor array; and a second imaging mirror configured to reflect the second light beam after the intersection region and towards the sensor array, wherein the first imaging mirror and the second imaging mirror are oriented such that a surface normal to a mirror surface of the first imaging mirror is oriented at an angle between 90° and 180° from a surface normal to a mirror surface of the second imaging mirror.

20. An optical assembly comprising:

one or more light sources configured to generate a first light beam and a second light beam that intersects the first light beam at an intersection region to thereby illuminate an object within the intersection region;

a sensor array configured to receive the first light beam and the second light beam to thereby form a stereo-image based on received light from the first light beam and the second light beam;

a first imaging mirror configured to reflect the first light beam after the intersection region and towards the sensor array;

a second imaging mirror configured to reflect the second light beam after the intersection region and towards the sensor array;

a focusing lens configured to collect and focus reflected light from the first imaging mirror to a first portion of the sensor array and from the second imaging mirror to a second portion of the sensor array, wherein a depth of field of the focusing lens is larger than an expected shift of the object.

\* \* \* \* \*